(12) United States Patent
Nishio et al.

(10) Patent No.: US 12,703,777 B2
(45) Date of Patent: Aug. 11, 2026

(54) LAMINATE

(71) Applicants: DAICEL CORPORATION, Osaka (JP); DAIKIN INDUSTRIES, LTD., Osaka (JP)

(72) Inventors: Naotaka Nishio, Tokyo (JP); Shinji Maetani, Tokyo (JP); Takahiro Sakakibara, Tokyo (JP); Ryosuke Ieki, Tokyo (JP); Takema Nakazawa, Osaka (JP); Masaya Kasai, Osaka (JP); Takahisa Sueoka, Osaka (JP)

(73) Assignees: DAICEL CORPORATION, Osaka (JP); DAIKIN INDUSTRIES, LTD., Osaka (JP)

( * ) Notice: Subject to any disclaimer, the term of this patent is extended or adjusted under 35 U.S.C. 154(b) by 732 days.

(21) Appl. No.: 17/915,245

(22) PCT Filed: Mar. 23, 2021

(86) PCT No.: PCT/JP2021/011912
§ 371 (c)(1),
(2) Date: Sep. 28, 2022

(87) PCT Pub. No.: WO2021/200382
PCT Pub. Date: Oct. 7, 2021

(65) Prior Publication Data

US 2023/0129711 A1 Apr. 27, 2023

(30) Foreign Application Priority Data

Mar. 31, 2020 (JP) ................................ 2020-061735
Mar. 31, 2020 (JP) ................................ 2020-061833
(Continued)

(51) Int. Cl.
*C08J 9/36* (2006.01)
*B01D 69/02* (2006.01)
(Continued)

(52) U.S. Cl.
CPC .............. *C08J 9/365* (2013.01); *B01D 69/02* (2013.01); *B01D 71/58* (2013.01); *B32B 3/28* (2013.01);
(Continued)

(58) Field of Classification Search
None
See application file for complete search history.

(56) References Cited

U.S. PATENT DOCUMENTS 9,921,010 B2 3/2018 Ootomo et al.
2014/0093792 A1* 4/2014 Takamori ............ H01M 8/1044 429/408
(Continued)

FOREIGN PATENT DOCUMENTS

CN 110308503 A 10/2019
JP 60-205193 A 10/1985
(Continued)

OTHER PUBLICATIONS

Takeda., H., Heat Exchange Sheet, Jul. 12, 2018, machine translation of JP2018-109492 (Year: 2018).*
(Continued)

*Primary Examiner* — Chinessa T. Golden
(74) *Attorney, Agent, or Firm* — Birch, Stewart, Kolasch & Birch, LLP

(57) ABSTRACT

The present disclosure provides a laminate having low air permeability and excellent moisture permeability, a partition member for total heat exchange element composed of the laminate, a total heat exchange element provided with a plurality of the partition members for total heat exchange element, and a ventilation device provided with the total heat exchange element. The laminate of the present disclosure is provided with a porous substrate and a moisture-permeable membrane disposed on one side of the porous substrate, the
(Continued)

moisture-permeable membrane being provided with a porous substrate and a moisture-permeable membrane disposed on at least one side of the porous substrate, and the moisture-permeable membrane being formed of a thermoplastic copolymer having a side chain containing a hydrophilic group which is a functional group.

14 Claims, 14 Drawing Sheets

(30) Foreign Application Priority Data

Sep. 30, 2020 (JP) ................................ 2020-164275
Sep. 30, 2020 (JP) ................................ 2020-164298

(51) Int. Cl.

| | |
|---|---|
| ***B01D 71/58*** | (2006.01) |
| ***B32B 3/28*** | (2006.01) |
| ***B32B 27/16*** | (2006.01) |
| ***B32B 27/32*** | (2006.01) |
| ***C08F 220/36*** | (2006.01) |
| ***C08F 220/68*** | (2006.01) |
| ***C08J 7/04*** | (2020.01) |
| ***C09D 133/06*** | (2006.01) |
| ***C09D 133/14*** | (2006.01) |
| ***F24F 12/00*** | (2006.01) |
| ***F28D 9/00*** | (2006.01) |
| ***F28D 21/00*** | (2006.01) |
| ***F28F 21/06*** | (2006.01) |

(52) U.S. Cl.

CPC .............. *B32B 27/16* (2013.01); *B32B 27/32* (2013.01); *C08F 220/36* (2013.01); *C08F 220/68* (2013.01); *C08J 7/0427* (2020.01); *C09D 133/062* (2013.01); *C09D 133/14* (2013.01); *F24F 12/006* (2013.01); *F28D 9/0062* (2013.01); *F28D 21/0014* (2013.01); *F28D 21/0015* (2013.01); *F28F 21/065* (2013.01); *B01D 2325/20* (2013.01); *B01D 2325/36* (2013.01); *B01D 2325/38* (2013.01); *B32B 2255/10* (2013.01); *B32B 2255/26* (2013.01); *B32B 2307/724* (2013.01); *C08J 2323/02* (2013.01); *C08J 2433/10* (2013.01); *C08J 2433/14* (2013.01); *F28F 2245/02* (2013.01); *F28F 2245/04* (2013.01); *Y02B 30/56* (2013.01)

(56) References Cited

U.S. PATENT DOCUMENTS

| | | | | |
|---|---|---|---|---|
| 2015/0198390 | A1* | 7/2015 | Ootomo | F28D 21/0015 165/133 |
| 2018/0305652 | A1* | 10/2018 | Katayama | C12M 23/16 |

FOREIGN PATENT DOCUMENTS

| | | | | |
|---|---|---|---|---|
| JP | 2014-55683 | A | | 3/2014 |
| JP | 2015-186862 | A | | 10/2015 |
| JP | 2018109492 | A | * | 7/2018 |
| WO | WO 2019/045057 | A1 | | 3/2019 |

OTHER PUBLICATIONS

International Search Report and Written Opinion of the International Searching Authority for International Application No. PCT/JP2021/011912, dated Jun. 15, 2021, with English translation.

Extended European Search Report for European Application No. 21779861.0, dated Apr. 2, 2024.

Communication Pursuant to Article 94(3) EPC in Applic. No. 21 779 861.0, issued Jun. 16, 2026.

* cited by examiner

LAMINATE

TECHNICAL FIELD

The present disclosure relates to a laminate. More specifically, the present disclosure relates to a laminate provided with a porous substrate and a moisture-permeable membrane disposed on at least one side of the porous substrate. The present application claims priority from the Japanese Patent Application No. 2020-061735 filed in Japan on Mar. 31, 2020, the Japanese Patent Application No. 2020-061833 filed in Japan on Mar. 31, 2020, the Japanese Patent Application No. 2020-164275 filed in Japan on Sep. 30, 2020, and the Japanese Patent Application No. 2020-164298 filed in Japan on Sep. 30, 2020, the contents of which are incorporated herein by reference.

BACKGROUND ART

Heat exchange ventilation devices that exchange heat between supply air and exhaust air during ventilation are known as devices capable of ventilating without impairing the effects of cooling and heating.

Heat exchange sheets for performing heat exchange are used in heat exchange ventilation devices. As a partition member that physically separates supply air and exhaust air, a heat exchange sheet is required to have a low air permeability (gas barrier property), for preventing supply air and exhaust air from mixing with each other, and heat transfer property, for exchanging heat between supply air and exhaust air. In addition, a heat exchange sheet (partition member for total heat exchange element) used in a total heat exchanger, which exchanges temperature (sensible heat) and moisture (latent heat) between supply air and exhaust air, is further required to have a high moisture permeability.

A sheet using a moisture-permeable membrane formed of, for example, calcium chloride or lithium chloride which have deliquescency, or a low molecular weight compound such as sulfuric acid or sodium hydroxide can be considered as an example of a heat exchange sheet used in a total heat exchanger. Among them, a moisture-permeable membrane formed of calcium chloride or lithium chloride is widely used from the perspective of safety. However, a moisture-permeable membrane formed of a compound having deliquescency or a low molecular weight compound is highly soluble in water and has poor water resistance.

Another known heat exchange sheet used in a total heat exchanger is a partition member to be used as a partition member for total heat exchange element having a porous substrate and a hydrophilic polymer compound provided on the surface and the inner part of the porous substrate, the hydrophilic polymer compound being a polymer of a compound having a quaternary ammonium group and an amide group (see Patent Document 1).

CITATION LIST

Patent Document

Patent Document 1: JP 2014-55683 A

SUMMARY OF INVENTION

Technical Problem

However, the hydrophilic polymer compound using a polymer of a compound having a quaternary ammonium group and an amide group described in Patent Document 1 has insufficient moisture permeability. In particular, the moisture permeability in a low temperature and low humidity environment is insufficient.

Accordingly, an object of the present disclosure is to provide a laminate having low air permeability and excellent moisture permeability.

Solution to Problem

As a result of diligent studies to achieve the above object, the inventors of the present disclosure found that a laminate provided with a porous substrate and a moisture-permeable membrane that is disposed on at least one side of the porous substrate, the moisture-permeable membrane being formed of a specific copolymer, has low air permeability and excellent moisture permeability. The present invention relates to what has been completed based on these findings.

The present disclosure provides a laminate including a porous substrate and a moisture-permeable membrane disposed on at least one side of the porous substrate, the moisture-permeable membrane being formed of a thermoplastic copolymer having a side chain containing a hydrophilic group which is a functional group.

The hydrophilic group is preferably a betaine group.

The copolymer preferably further contains a hydrophobic functional group in a side chain.

The copolymer is preferably formed of a copolymer containing a constituent unit represented by the following Formula (1) as a constituent unit having the side chain containing the betaine group and a constituent unit represented by the following Formula (2) as a constituent unit having the hydrophobic functional group in the side chain. The molar ratio of the constituent unit represented by Formula (1) to the constituent unit represented by Formula (2) is from 1/100 to 100/1:

[Chem. 1]

(1)

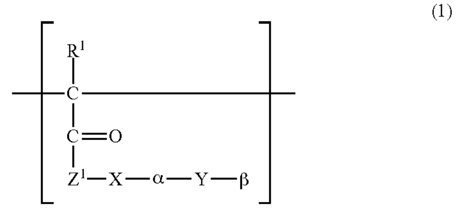

where in Formula (1), $R^1$ represents a hydrogen atom or an alkyl group having from 1 to 4 carbons; X represents a divalent hydrocarbon group having from 1 to 4 carbons; Y represents a divalent linear hydrocarbon group having from 1 to 4 carbons; $Z^1$ represents O or NH; α and β represents a combination of a cation and an anion, and

[Chem. 2]

(2)

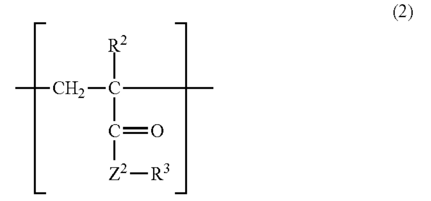

where in Formula (2), $R^2$ represents a hydrogen atom or an alkyl group having from 1 to 4 carbons, and $R^3$ represents a hydrocarbon group having 2 or more carbons; $Z^2$ represents O or NH.

The cation in Formula (1) above is preferably an ammonium ion.

The anion in Formula (1) above is preferably a phosphate ion, a sulfate ion, or a carbonate ion.

Formula (1) above preferably contains a group represented by the following Formula (1-1), a group represented by the following Formula (1-2), or a group represented by the following Formula (1-3);

[Chem. 4]

(1-1)

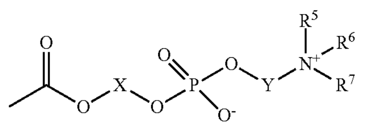

(1-2)

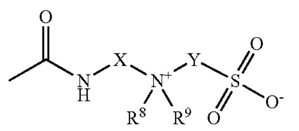

(1-3)

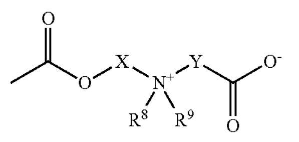

where in Formulas (1-1) to (1-3), X and Y are the same as described above, and the bond on the left side of the carbonyl carbon atom bonds to the carbon atom having $R^1$ in Formula (1); in Formula (1-1), $R^5$, $R^6$, and $R^7$ are the same or different and each represent an alkyl group having from 1 to 4 carbons; in Formula (1-2) and Formula (1-3), $R^8$ and $R^9$ are the same or different and each represent an alkyl group having from 1 to 4 carbons.

The weight average molecular weight of the copolymer is preferably from 20000 to 2000000.

The copolymer is preferably a random copolymer of a monomer forming the constituent unit represented by Formula (1) above and a monomer forming the constituent unit represented by Formula (2) above.

The surface of a side of the porous substrate on which the moisture-permeable membrane is provided preferably has been subjected to a hydrophilization treatment.

A moisture permeability is preferably 1600 g/($m^2$·24 h) or greater based on the moisture permeability testing method according to JIS Z0208-1976 under the conditions of a temperature of 20° C., a relative humidity of 65%, and a wind speed of 0.2 m/sec or less.

The moisture-permeable membrane surface has a structure in which a hydrophilic portion and a hydrophobic portion are phase-separated, and the maximum diameter of the hydrophilic portion on the moisture-permeable membrane surface is preferably 50 nm or less.

The present disclosure also provides a partition member for total heat exchange element composed of the laminate.

The present disclosure also provides a total heat exchange element including:

a plurality of the partition members for total heat exchange element, and a spacing member arranged between each of the laminated partition members that are laminated for total heat exchange element to maintain a space between the adjacent partition members for total heat exchange element, wherein a first air flow path and a second air flow path are alternately formed with the partition member for total heat exchange element interposed therebetween.

The present disclosure also provides a ventilation device including the total heat exchange element, wherein a supply air supplied from outdoor to indoor flows through the first air flow path of the total heat exchange element while an exhaust air exhausted from indoor to outdoor flows through the second air flow path of the total heat exchange element.

Advantageous Effects of Invention

The laminate of the present disclosure has low air permeability and excellent moisture permeability. The laminate of the present disclosure also has excellent moisture permeability in a low temperature and low humidity environment. As such, the laminate of the present disclosure can be particularly preferably used as a partition member for total heat exchange element.

DESCRIPTION OF EMBODIMENTS

Laminate

The laminate according to an embodiment of the present disclosure is provided with at least a porous substrate and a moisture-permeable membrane disposed on at least one side of the porous substrate. The moisture-permeable membrane may be disposed on one side of the porous substrate, or may be disposed on both sides of the porous substrate. Furthermore, the laminate may have a structure in which the moisture-permeable membrane is sandwiched between two of the porous substrates. That is, the porous substrate may be disposed on both sides of the moisture-permeable membrane. In this case, the two of the porous substrates may be the same porous substrate, or may be porous substrates having different material, thickness, or the like.

Figure 1:
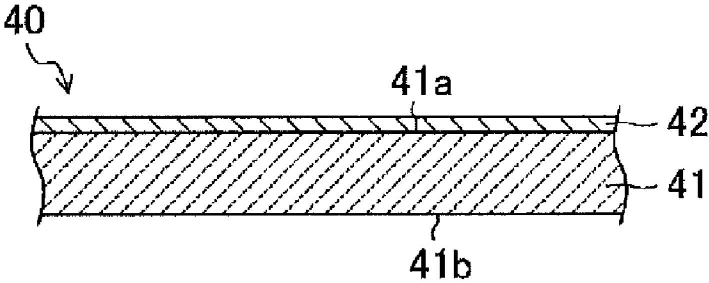
FIG. 1 is a schematic cross-sectional view illustrating a laminate of an embodiment of the present disclosure.

FIG. 1 is a schematic cross-sectional view illustrating a laminate of an embodiment of the present disclosure. A laminate (40) is provided with a porous substrate (41) and a moisture-permeable membrane (42) disposed on one side (41*a*) of the porous substrate (41).

The moisture-permeable membrane is formed of a thermoplastic copolymer having a side chain containing a hydrophilic group which is a functional group. The copolymer has a hydrophilic portion by having the side chain containing a hydrophilic group. As such, it is inferred that a hydrophilic portion is formed in the moisture-permeable membrane formed of the copolymer, and that the hydrophilic portion can function as a water guide path to allow more water vapor to pass through, resulting in excellent moisture permeability. Further, in general, a moisture-permeable membrane formed of calcium chloride or potassium chloride tends to have an extremely low moisture absorption amount and inferior moisture permeability in a low temperature and low humidity environment: however, regarding the moisture-permeable membrane formed of the copolymer described above, the moisture absorption amount does not become extremely low while the moisture permeability is excellent even in a low temperature and low humidity environment. Examples of the hydrophilic group contained in a side chain include a betaine group, a urethane group, a hydroxyl group, a carboxyl group, a sulfonic acid group, and an amino group; of which, a betaine group is preferable because it is amphoteric and extremely hydrophilic. One type of the side chain containing a hydrophilic group may be contained, or two or more types thereof may be contained.

The thermoplastic copolymer means that the polymer main chain is a thermoplastic resin. Examples of the thermoplastic resin include a polyester-based resin such as an acrylic-based resin, a cellulose-based resin, and polybutylene terephthalate; a polyether-based resin; a polyurethane-based resin; a polyvinyl chloride-based resin; polyethylene; a polystyrene-based resin; a polyamide-based resin; a polyacetal-based resin; a polycarbonate-based resin; a polyphenylene sulfide-based resin; polyether ether ketone; a polyimide-based resin; a polytetrafluoroethylene-based resin; polycaprolactone; and polylactic acid.

The copolymer preferably further contains a hydrophobic functional group in a side chain. The copolymer has a hydrophobic portion by having the side chain containing a hydrophobic functional group in addition to the side chain containing a betaine group. As such, a hydrophobic portion is formed together with the hydrophilic portion in the moisture-permeable membrane formed of the copolymer. As such, it is inferred that a structure in which the hydrophilic part and the hydrophobic part are phase-separated is formed in the moisture-permeable membrane formed of the copolymer, and that the hydrophilic portion can function as a water guide path to allow more water vapor to pass through, resulting in higher moisture permeability. Examples of the hydrophobic functional group include a hydrocarbon group having 2 or more carbons. One type of the hydrophobic functional group may be contained, or two or more types thereof may be contained.

The copolymer preferably contains a constituent unit represented by Formula (1) below as a constituent unit having the side chain containing the betaine group and a constituent unit represented by Formula (2) below as a constituent unit having the hydrophobic functional group in the side chain. Furthermore, the copolymer preferably has a molar ratio of the constituent unit represented by Formula (1) to the constituent unit represented by Formula (2) of from 1/100 to 100/1:

[Chem. 1]

(1)

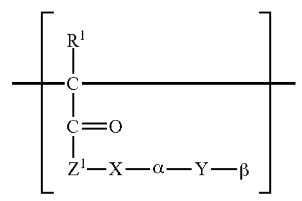

where in Formula (1), $R^1$ represents a hydrogen atom or an alkyl group having from 1 to 4 carbons; X represents a divalent hydrocarbon group having from 1 to 4 carbons; Y represents a divalent linear hydrocarbon group having from 1 to 4 carbons; $Z^1$ represents O or NH; α and β represents a combination of a cation and an anion.

[Chem. 2]

(2)

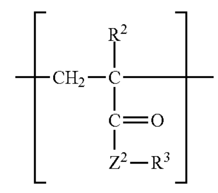

where in Formula (2), $R^2$ represents a hydrogen atom or an alkyl group having from 1 to 4 carbons, and $R^3$ represents a hydrocarbon group having 2 or more carbons; $Z^2$ represents O or NH.

By containing the constituent unit represented by Formula (1) above, the copolymer has an amphoteric and extremely hydrophilic group derived from α and β, and has a hydrophilic portion. Furthermore, by containing the constituent unit represented by Formula (2) above, the copolymer has an alkyl ester moiety having 2 or more carbons, which is a hydrophobic portion. In addition, by keeping the molar ratio within the range described above, the hydrophilic portion and the hydrophobic portion in the copolymer are present in a well-balanced manner. As such, it is inferred that a structure in which the hydrophilic part and the hydrophobic part are phase-separated is formed in the moisture-permeable membrane formed of the copolymer, and that the hydrophilic portion can function as a water guide path to allow more water vapor to pass through, resulting in excellent moisture permeability. Further, in general, a moisture-permeable membrane formed of calcium chloride or potassium chloride tends to have an extremely low moisture absorption amount and inferior moisture permeability in a low temperature and low humidity environment; however, regarding the moisture-permeable membrane formed of the copolymer described above, the moisture absorption amount does not become extremely low while the moisture permeability is excellent even in a low temperature and low humidity environment. In addition, regarding the hydrophilic portion and the hydrophobic portion, when the proportion of the hydrophobic portion in the molar ratio is increased, it is also possible to obtain a moisture-permeable membrane that has excellent moisture permeability, is difficult to dissolve in water, and has excellent water resistance. Furthermore, since the pH of the aqueous solution of the copolymer described above is weakly acidic, it is less likely to cause corrosion of metal (that is, excellent metal corrosion resistance) as compared to a moisture-permeable membrane using a conventional strongly acidic resin having an acidic functional group such as a sulfonyl group.

Examples of a constituent unit containing the constituent unit represented by Formula (1) above include a constituent unit represented by Formula (1') below:

[Chem. 3]

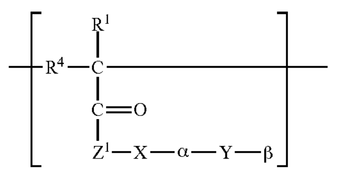

(1')

where in Formula (1'), $R^4$ represents a divalent hydrocarbon group; $R^1$, X, Y, $Z^1$, α, and β are the same as described above.

In Formula (1'), $R^4$ represents a divalent hydrocarbon group, and examples thereof include an alkylene group having from 1 to 4 carbons such as a methylene group and an ethylene group. Examples of the constituent unit represented by Formula (1') above in which $R^4$ is a methylene group include a constituent unit derived from an acrylate and a constituent unit derived from a methacrylate. The divalent hydrocarbon group may have a substituent.

In Formula (1), $R^1$ represents a hydrogen atom or an alkyl group having from 1 to 4 carbons, preferably a hydrogen atom or a methyl group, more preferably a methyl group.

In Formula (1), X represents a divalent hydrocarbon group having from 1 to 4 carbons, and examples thereof include an alkylene group, an alkenylene group, and an alkynylene group. Examples of the alkylene group include a linear or branched $C_{1-4}$ alkylene group, such as a methylene group, a dimethylene group, a trimethylene group, an isopropylene group, and a tetramethylene group. Examples of the alkenylene group include a linear or branched $C_{2-4}$ alkenylene group, such as an ethynylene group, a 1-propenylene group, an isopropenylene group, a 1-butenylene group, a 2-butenylene group, and a 3-butenylene group. Among these, the divalent hydrocarbon group is preferably a linear or branched alkylene group, more preferably a linear alkylene group.

In Formula (1), Y represents a divalent linear hydrocarbon group having from 1 to 4 carbons, and examples thereof include an alkylene group, an alkenylene group, and an alkynylene group. Examples of the alkylene group include a methylene group, a dimethylene group, a trimethylene group, and a tetramethylene group. Examples of the alkenylene group include an ethynylene group, a 1-propenylene group, and a 1-butenylene group. Among these, the divalent linear hydrocarbon group is preferably an alkylene group, and more preferably a linear alkylene group. By adjusting the number of carbons in X and Y to be within the range above, the balance between hydrophobicity and hydrophilicity is optimized.

In Formula (1), $Z^1$ represents O or NH. That is, the divalent linking group $Z^1$ is —O-(ether bond) or an amino bond (—NH—), and forms an ester bond or an amide bond together with the adjacent carbonyl carbon in the constituent unit represented by Formula (1) above.

In Formula (1), α and β are a combination of a cation and an anion. That is, either α is a cation while β is an anion, or α is an anion while β is a cation. The cation is preferably an ammonium ion. The anion is preferably a phosphate ion ($—PO_4^-$), a sulfate ion ($—SO_3^-$), or a carbonate ion ($—CO_2^-$). When the anion is a phosphate ion, the constituent unit represented by Formula (1) above includes a phosphobetaine; when the anion is a sulfate ion, the constituent unit represented by Formula (1) above includes a sulfobetaine; and when the anion is a carbonate ion, the constituent unit represented by Formula (1) above includes a carbobetaine. The anion may have a resonance structure in the copolymer described above.

Examples of the constituent unit represented by Formula (1) above in which the cation is an ammonium ion while the anion is a phosphate ion ($—PO_4^-$), a sulfate ion ($—SO_3^-$), or a carbonate ion ($—CO_2—$)

include those having a group represented by Formulas (1-1) to (1-3) below:

[Chem. 4]

(1-1)

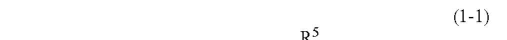

(1-2)

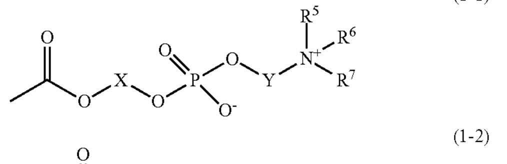

(1-3)

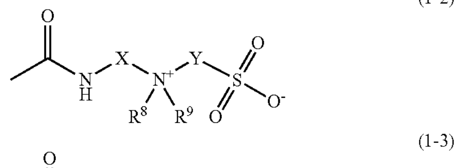

where in Formulas (1-1) to (1-3), X and Y are the same as described above, and the bond on the left side of the carbonyl carbon atom [in Formula (1-3), the carbonyl carbon atom on the left side] bonds to the carbon atom having $R^1$ in Formula (1); in Formula (1-1), $R^5$, $R^6$, and $R^7$ are the same or different and each represent an alkyl group having from 1 to 4 carbons; in Formula (1-2) and Formula (1-3), $R^8$ and $R^9$ are the same or different and each represent an alkyl group having from 1 to 4 carbons.

In Formula (1-1), $R^5$, $R^6$, and $R^7$ are the same or different and each represent an alkyl group having from 1 to 4 carbons; Examples of the alkyl group having from 1 to 4 carbons include a methyl group, an ethyl group, a propyl group, a butyl group, and a t-butyl group. Among these, a methyl group is preferred.

In Formula (1-1), among the examples listed, X is preferably a dimethylene group while Y is preferably a dimethylene group.

Examples of the monomer forming the constituent unit represented by Formula (1-1) above include 2-methacryloyloxyethyl phosphorylcholine.

Examples of the constituent unit represented by Formula (1') above when the group represented by Formula (1-1) above is contained include a constituent unit represented by Formula (1'-1) below:

[Chem. 5]

(1'-1)

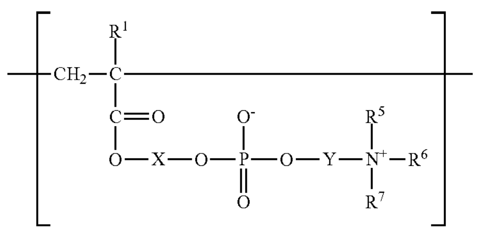

where in Formula (1'-1), $R^1$, $R^5$, $R^6$, $R^7$, X, and Y are the same as described above.

In Formula (1-2), $R^8$ and $R^9$ are the same or different and each represent an alkyl group having from 1 to 4 carbons. Examples of the alkyl group having from 1 to 4 carbons include a methyl group, an ethyl group, a propyl group, a butyl group, and a t-butyl group. Among these, a methyl group is preferred.

In Formula (1-2), X is preferably a trimethylene group while Y is preferably a tetramethylene group.

In Formula (1-3), $R^8$ and $R^9$ are the same or different and each represent an alkyl group having from 1 to 4 carbons. Examples of the alkyl group having from 1 to 4 carbons include a methyl group, an ethyl group, a propyl group, a butyl group, and a t-butyl group. Among these, a methyl group is preferred.

In Formula (1-3), X is preferably a dimethylene group while Y is preferably a methylene group.

In Formula (2), $R^2$ represents a hydrogen atom or an alkyl group having from 1 to 4 carbons, preferably a hydrogen atom or a methyl group, more preferably a methyl group.

In Formula (2), $R^3$ represents a hydrocarbon group having 2 or more carbons. From the viewpoint of a more appropriate hydrophobicity of the hydrophobic portion, the number of carbons is preferably from 4 to 26, more preferably from 8 to 22, even more preferably from 10 to 20, and particularly preferably from 14 to 18.

Examples of the hydrocarbon group having 2 or more carbons include an aliphatic hydrocarbon group, an alicyclic hydrocarbon group, an aromatic hydrocarbon group, and a group in which two or more of those listed above are bonded.

Examples of the aliphatic hydrocarbon group include an alkyl group, an alkenyl group, and an alkynyl group. Examples of the alkyl group include a linear or branched alkyl group, such as an ethyl group, a propyl group, an isopropyl group, a butyl group, a hexyl group, an octyl group, an isooctyl group, a decyl group, a dodecyl group, and a stearyl group. Examples of the alkenyl group include a linear or branched alkenyl group, such as a vinyl group, an allyl group, a methallyl group, a 1-propenyl group, an isopropenyl group, a 1-butenyl group, a 2-butenyl group, a 3-butenyl group, a 1-pentenyl group, a 2-pentenyl group, a 3-pentenyl group, a 4-pentenyl group, and a 5-hexenyl group. Examples of the alkynyl group include a linear or branched alkynyl group, such as an ethynyl group and a propynyl group.

Examples of the alicyclic hydrocarbon group include: a $C_{3-12}$ cycloalkyl group, such as a cyclopropyl group, a cyclobutyl group, a cyclopentyl group, a cyclohexyl group, and a cyclododecyl group; a $C_{3-12}$ cycloalkenyl group, such as a cyclohexenyl group; and a $C_{4-15}$ crosslinked cyclic hydrocarbon group, such as a bicycloheptanyl group and a bicycloheptenyl group.

Examples of the aromatic hydrocarbon group include a $C_{6-14}$ aryl group, such as a phenyl group and a naphthyl group (especially, a $C_{6-10}$ aryl group).

Among these, the hydrocarbon group having 2 or more carbons is preferably an aliphatic hydrocarbon group, more preferably a linear or branched alkyl group, and further preferably a linear alkyl group.

In Formula (2), $Z^2$ represents O or NH. That is, the divalent linking group $Z^2$ is —O-(ether bond) or an amino bond (—NH—), and forms an ester bond or an amide bond together with the adjacent carbonyl carbon in the constituent unit represented by Formula (1) above.

Examples of the monomer forming the constituent unit represented by Formula (2) above include stearyl (meth) acrylate.

Only one type of each of the constituent unit represented by Formula (1) above and the constituent unit represented by Formula (2) above may be contained, or two or more types of each of the constituent unit represented by Formula (1) above and the constituent unit represented by Formula (2) above may be contained.

A molar ratio of the constituent unit having the side chain containing a betaine group to the constituent unit having the hydrophobic functional group in a side chain [preferably, the molar ratio of the constituent unit represented by Formula (1) above to the constituent unit represented by Formula (2) above] (the former/the latter) is preferably from 1/100 to 100/1 (that is, from 0.01 to 100.0), more preferably from 0.01 to 90, even more preferably from 0.02 to 80, further preferably from 0.1 to 20, and particularly preferably from 0.5 to 5.

A molar ratio of the hydrophilic portion to the hydrophobic portion (the former/the latter) in the copolymer is preferably from 0.01 to 2.0, more preferably from 0.01 to 1.5, and even more preferably from 0.01 to 1.3. Note that, regarding the hydrophilic portion and the hydrophobic portion, when a negative integral value is an attraction value relative to water while a positive integral value is a repulsive value relative to water in an energy histogram of a combination of a solute and a solvent obtained from a process of calculating free energy based on energy representation, the term indicated as the attraction value is referred to as the hydrophilic portion while the term indicated as the repulsive value is referred to as the hydrophobic portion.

In the copolymer described above, the polymerized form of the constituent unit having the side chain containing a betaine group and the constituent unit having the hydrophobic functional group in a side chain (in particular, the copolymerized form of the constituent unit represented by Formula (1) above and the constituent unit represented by Formula (2) above) is not limited, and may be any of block copolymerization, alternating copolymerization, and random copolymerization. When the copolymer is a copolymer of the monomer forming the constituent unit represented by Formula (1) above and the monomer forming the constituent unit represented by Formula (2) above, the copolymer may be any of a block copolymer, an alternating copolymer, or a random copolymer. Among these, the copolymer is preferably a random copolymer.

The copolymer may have a constituent unit derived from another monomer in addition to the constituent unit represented by Formula (1) above and the constituent unit represented by Formula (2) above. However, in the copolymer, the total number of moles of the constituent unit represented by Formula (1) above and the constituent unit represented by Formula (2) above is preferably 50 mol % or greater, more preferably 90 mol % or greater, and even more preferably 99 mol % or greater, relative to the total number of moles of constituent units derived from all the monomers constituting the copolymer.

The weight average molecular weight of the copolymer is not limited, but is preferably from 20000 to 2000000, more preferably from 30000 to 1500000, even more preferably from 50000 to 1000000, and particularly preferably from 70000 to 500000. The weight average molecular weight is a value measured by gel permeation chromatography (GPC) and calibrated with polystyrene standards.

The moisture-permeable membrane is formed of the copolymer. The moisture-permeable membrane may include another component in addition to the copolymer within a range that does not impair the effects of the laminate of the present disclosure.

The moisture-permeable membrane preferably includes a preservative as the another component. The preservative preferably has a diameter smaller than the thickness of the moisture-permeable membrane from the viewpoint of not easily falling off from the moisture-permeable membrane. Note that the diameter of the preservative refers to the maximum particle size of the preservative.

A thickness of the moisture-permeable membrane is not limited, but is preferably from 50 to 1000 nm, and more preferably from 100 to 500 nm. When the thickness is 50 nm or greater, the membrane-forming property becomes good, leading to improved gas barrier property. When the thickness is 1000 nm or less, the moisture permeability becomes better. Further, it is easy to form a thin membrane of the moisture-permeable membrane of 1000 nm or less, and cost efficiency is excellent.

When the copolymer has a hydrophilic portion and a hydrophobic portion, this results in the moisture-permeable membrane having a structure in which the hydrophilic portion and the hydrophobic portion are phase-separated on the surface of the moisture-permeable membrane. The maximum diameter of the hydrophilic portion on the moisture-permeable membrane surface is preferably 50 nm or less, and more preferably 20 nm or less. When the maximum diameter of the hydrophilic portion is 50 nm or less, a substance having a size of 50 nm or more is less likely to pass through the moisture-permeable membrane, and the moisture-permeable membrane can be used as a barrier film which does allow a substance of 50 nm or more (such as a virus) to pass through. The diameter of the hydrophilic part is evaluated by the following method. Using the adhesion measurement mode of a scanning probe microscope (SPM), a portion with high adsorption (hydrophilic portion) and a portion with low adsorption (hydrophobic portion) are quantified based on the adhesion, the values are processed by an image analysis software, and the diameter of the hydrophilic portion can be calculated in the form of an equivalent spherical diameter. Furthermore, the maximum diameter is the diameter having the largest value among the diameters of the hydrophilic portion (equivalent spherical diameter) calculated as described above.

As an element that serves as a support of the moisture-permeable membrane, the porous substrate preferably has excellent moisture permeability.

A material that forms the porous substrate may be either a hydrophilic material or a hydrophobic material, but is preferably a hydrophobic material. In a case in which the hydrophobic material is used, when an aqueous composition for forming moisture-permeable membrane is being applied, the aqueous composition does not penetrate into the porous substrate, and as such, it becomes unnecessary to have a lead substrate for preventing the aqueous composition from flowing down from the side opposite to the coating film-formed side of the porous substrate.

Examples of the material that forms the porous substrate include a polyolefin-based resin, a cellulose-based resin, a polycarbonate resin, a polyamide resin, a polyimide resin, a polyamide-imide resin, a fluorine-based resin, an inorganic substance such as metal, glass and ceramic, and paper. Among these, a polyolefin-based resin is preferable since the moisture-permeable membrane can be formed on the porous substrate at a relatively low temperature and from the viewpoint of excellent moisture permeability and water resistance. The material may be in the form of fibers such as metal fibers and inorganic fibers. The material that forms the porous substrate may be only one type or two or more types.

Examples of the porous substrate include a resin porous membrane, an inorganic porous film, a metal porous membrane, and a fibrous substrate.

The polyolefin-based resin is a polymer (including an olefin-based elastomer) composed of an olefin as an essential monomer component, that is, a polymer containing at least a constituent unit derived from an olefin in a molecule (in one molecule). The olefin is not limited, and examples thereof include an $\alpha$-olefin such as ethylene, propylene, 1-butene, and 4-methyl-1-pentene.

Examples of the polyolefin-based resin include a polymer composed of ethylene as an essential monomer component (polyethylene-based resin), a polymer composed of propylene as an essential monomer component (polypropylene-based resin), an ionomer, and an amorphous cyclic olefin-based polymer. Among these, a polypropylene-based resin is preferable.

A porosity of the porous substrate is not limited, but is preferably from 30 to 90 vol %, and more preferably from 40 to 70 vol %. When the porosity is 30 vol % or greater, moisture permeability improves. When the porosity is 90 vol % or less, the support performance of the moisture-permeable membrane improves.

A thickness of the porous substrate is not limited, but is preferably 5 μm or greater, and more preferably 10 μm or greater, from the viewpoint of allowing the moisture-permeable membrane to be sufficiently supported. In addition, the thickness of the porous substrate is preferably 50 μm or less, and more preferably 30 μm or less, taking into account the viewpoint of excellent moisture permeability and/or cost efficiency.

The surface of a side of the porous substrate on which the moisture-permeable membrane (for example, the side 41*a* illustrated in FIG. 1) is provided preferably has been subjected to a hydrophilization treatment, from the viewpoint of making it possible to easily form the moisture-permeable membrane. In particular, when a hydrophobic material is used as the material that forms the porous substrate, it is preferable that the hydrophilization treatment is performed. Examples of the hydrophilization treatment include corona discharge treatment and plasma treatment. These hydrophilization treatments allow a carboxy group, a hydroxy group, or a carbonyl group to be generated at a porous substrate surface; as such, the aqueous composition for forming moisture-permeable membrane easily wets the porous substrate surface and spreads on the porous substrate surface, making it easy to form the moisture-permeable membrane. Also, this improves adhesion between the porous substrate and the moisture-permeable membrane. In addition, when the porous substrate formed of a hydrophobic substrate is stored as a roll, the roll is in a form in which one side and the other side of the porous substrate are in contact with each other; since the one side having hydrophilicity and the other side having hydrophobicity are in contact with each other, blocking can be prevented.

A surface tension of the surface of a side of the porous substrate on which the moisture-permeable membrane is formed is preferably from 35 to 55 dyn/cm, and more preferably from 37 to 50 dyn/cm. When the surface tension is 35 dyn/cm or more, it becomes easy to apply the aqueous composition for forming moisture-permeable membrane, and the formation of the moisture-permeable membrane becomes easy. When the surface tension is 55 dyn/cm or less, the aqueous composition for forming moisture-permeable membrane does not wet and spread too much, and the moisture-permeable membrane can be easily formed on a porous substrate surface. Note that in a case in which a surface of the porous substrate has been subjected to a hydrophilization treatment, the surface of the side on which the moisture-permeable membrane is formed is the surface that has undergone the hydrophilization treatment.

A surface tension of the inner part of the porous substrate (that is, a region of the porous substrate in which the moisture-permeable membrane is not formed) is preferably less than 35 dyn/cm, and more preferably 33 dyn/cm or less. When the surface tension is less than 35 dyn/cm, the aqueous composition for forming moisture-permeable membrane is suppressed from penetrating into the inner part of the porous substrate, and the moisture-permeable membrane can be easily formed on a porous substrate surface. Note that in a case in which a surface of the porous substrate has been subjected to a hydrophilization treatment, the inner part of the porous substrate is a region that has not undergone a hydrophilization treatment. Furthermore, the surface tension of the inner part can be obtained by measuring a cross-section obtained by cutting the porous substrate.

The laminate preferably has a moisture permeability of 1600 g/($m^2$·24 h) or more, more preferably 1700 g/($m^2$·24 h) or more, and even more preferably 1800 g/($m^2$·24 h) or greater based on the moisture permeability testing method (the cup method) according to JIS Z0208-1976 under the conditions of a temperature of 20° C., a relative humidity of 65%, and a wind speed of 0.2 m/s or less. The laminate has excellent moisture permeability, and thus it is possible to have a configuration in which the moisture permeability is 1600 g/($m^2$·24 h) or greater.

The laminate preferably has a moisture permeability of 300 g/($m^2$·24 h) or greater, more preferably 400 g/($m^2$·24 h) or greater, and even more preferably 500 g/($m^2$·24 h) or greater based on the moisture permeability testing method (the cup method) according to JIS Z0208-1976 under the conditions of a temperature of 5° C., a relative humidity of 45%, and a wind speed of 0.2 m/s or less. The laminate has an excellent moisture permeability in a low temperature and low humidity environment, and thus it is possible to have a configuration in which the moisture permeability is 300 g/($m^2$·24 h) or greater.

The laminate preferably has an air resistance based on the Gurley method according to JIS P8117-2009 of 3000 seconds/100 cc or greater, more preferably 4000 seconds/100 cc or greater, and even more preferably 5000 seconds/100 cc or greater. The laminate has a low air permeability, and thus it is possible to have a configuration in which the air resistance is 3000 seconds/100 cc or greater.

The laminate preferably has a rate of decrease in air resistance according to the following water resistance test of 50% or less, more preferably 20% or less, and even more preferably 15% or less. When the rate of decrease in air resistance is 50% or less, water resistance is superior. In addition, in a case in which the rate of decrease in air resistance is within the range described above while the molar ratio of the hydrophobic portion in the copolymer is high, water resistance is even better.

Water Resistance Test

A test piece of φ7 cm is cut out from the laminate, and the air resistance is measured (initial air resistance). Thereafter, the test piece is immersed in 1 L of room temperature water for 15 minutes, and then naturally dried at room temperature. The immersion and drying counts as one cycle, and the cycle is repeated 50 times on the test piece, resulting in a test piece after water resistance test. Then, the air resistance of the obtained test piece after water resistance test (air resistance after water resistance test) is measured. Then, the rate of decrease in air resistance is determined in accordance with the following formula. Note that both the initial air resistance and the air resistance after water resistance test are an air resistance based on the Gurley method according to JIS P8117-2009.

Rate of decrease in air resistance (%)=[(initial air resistance)−(air resistance after water resistance test)]/(initial air resistance)×100

The laminate preferably has an air resistance after water resistance test based on the Gurley method according to JIS P8117-2009 of 3000 seconds/100 cc or greater, more preferably 4000 seconds/100 cc or greater, and even more preferably 5000 seconds/100 cc or greater. The laminate has an excellent water resistance and an excellent moisture permeability, and thus it is possible to have a configuration in which the air resistance after water resistance test is 3000 seconds/100 cc or greater.

The laminate can be produced by forming the moisture-permeable film on the surface of at least one side of the porous substrate by a known or commonly-used method. For example, the moisture-permeable membrane may be formed directly on the surface of one side of the porous substrate, or the moisture-permeable membrane may be temporarily formed on another support, and then transferred to (bonded with) the surface of one side of the porous substrate to form the moisture-permeable membrane on the porous substrate.

Of which, the former method is preferable from the viewpoint of excellent adhesion between the moisture-permeable membrane and the porous substrate.

The surface of a side of the porous substrate on which the moisture-permeable membrane is provided may be subjected to a hydrophilic treatment. Examples of the hydrophilic treatment include those described above.

The moisture-permeable membrane can be formed by applying (coating) a composition for forming the moisture-permeable membrane on the porous substrate or on the other support, and removing solvent from the obtained coating film by heating or the like.

The composition can be produced by a known or commonly used method. For example, the composition can be produced by dissolving or dispersing the copolymer in a solvent and, as needed, mixing an additive such as a preservative. The solvent is preferably water and/or a water-soluble solvent. When water or a water-soluble solvent is used, it is inferred that the copolymer is dispersed in the composition in a core-shell shape in which the inner side is a hydrophobic portion while the outer side is a hydrophilic portion. By using such a composition, when the coating film is dried, the hydrophilic part and the hydrophobic part are phase-separated to form a moisture-permeable film having a water guide path, and it is inferred that the hydrophobic parts are firmly bonded to each other, leading to better water resistance.

Examples of the water-soluble solvent include: an aliphatic water-soluble alcohol, such as methanol, ethanol, n-propanol, and i-propanol; and a glycol ether, such as ethylene glycol monomethyl ether, ethylene glycol monobutyl ether, propylene glycol monomethyl ether, and propylene glycol monoethyl ether. One of the water-soluble solvents listed above may be used, or two or more thereof may be used.

A proportion (concentration) of the copolymer in the composition in which the copolymer is dissolved or dispersed is not limited, but is preferably from 0.5 to 5 mass %, more preferably from 1 to 4 mass %, and even more preferably from 1.5 to 3 mass %. When the concentration is 5 mass % or less, the thickness of the coating layer increases, and thus the film thickness of the moisture-permeable membrane after drying is more uniform. This makes it possible to form a moisture-permeable membrane that is thinner while having an excellent gas barrier property, and consequently, the moisture permeability is further improved. Furthermore, when the concentration is within the above range, it is easy to form a moisture-permeable membrane having excellent coatability as well as excellent moisture permeability and gas barrier property.

Note that a known coating method may be used for the application (coating) of the composition. For example, a coater such as a gravure roll coater, a reverse roll coater, a kiss roll coater, a dip roll coater, a bar coater, a knife coater, a spray coater, a comma coater, or a direct coater may be used.

The heating temperature when removing solvent from the coating film is preferably from 35 to 90° C., more preferably from 40 to 85° C., and even more preferably from 45 to 80° C. The heating time may be a suitable time employed as appropriate, but is, for example, from 5 seconds to 20 minutes, preferably from 5 seconds to 10 minutes, and more preferably from 10 seconds to 5 minutes. Since a moisture-permeable membrane can be formed at a low temperature of 90° C. or less (in particular, 80° C. or less) using the composition, film formation is easy, and a polyolefin-based resin having excellent moisture permeability can be used as the porous substrate.

The laminate has a low air permeability and an excellent moisture permeability. Furthermore, the laminate has an excellent moisture permeability and water resistance in a low temperature and low humidity environment. As such, the laminate can be preferably used in a product that requires such a function, such as a total heat exchange device, an undergarment, a disposable water-repellent/moisture-permeable material, and an application for dehydration without exposure to air or bacteria (a filter for storing aged meat, etc.). The laminate for total heat exchanger device is, for example, a sheet capable of exchanging temperature (sensible heat) and moisture (latent heat) between supply air and exhaust air. Further, when the laminate has a structure in which the hydrophilic portion and the hydrophobic portion are phase-separated, the laminate can also be used as a barrier film having moisture permeability. When the diameter of the hydrophilic portion is small, the barrier film having moisture permeability allows a hydrophilic substance that is small in size (for example, water vapor) to pass through the hydrophilic portion while not allowing a substance that is large in size (for example, a virus) to pass through, making it possible to separate the two.

By changing the shape of the laminate into a corrugated shape as needed and further performing lamination, the laminate can be turned into a total heat exchange device (partition member for total heat exchange element). The total heat exchanger device may be either a cross-flow type or a counter-flow type. A total heat exchange device using the laminate described above has a low air permeability, an excellent moisture permeability (in particular, moisture permeability in a low temperature and low humidity environment), and an excellent water resistance. The total heat exchanger device can be used as a total heat exchange device of an air conditioner. The air conditioner uses a total heat exchange device having a low air permeability, an excellent moisture permeability, as well as an excellent moisture permeability in a low temperature and low humidity environment, and an excellent water resistance; as such, the air conditioner has an excellent indoor heat retention, an excellent indoor moisture retention, and an excellent durability even in a low temperature and low humidity environment.

Total Heat Exchange Element and Ventilation Device (First Embodiment)

The total heat exchange element and the ventilation device according to the first embodiment of the present disclosure are provided with the partition member for total heat exchange element described above.

Total Heat Exchange Element

Figure 2:
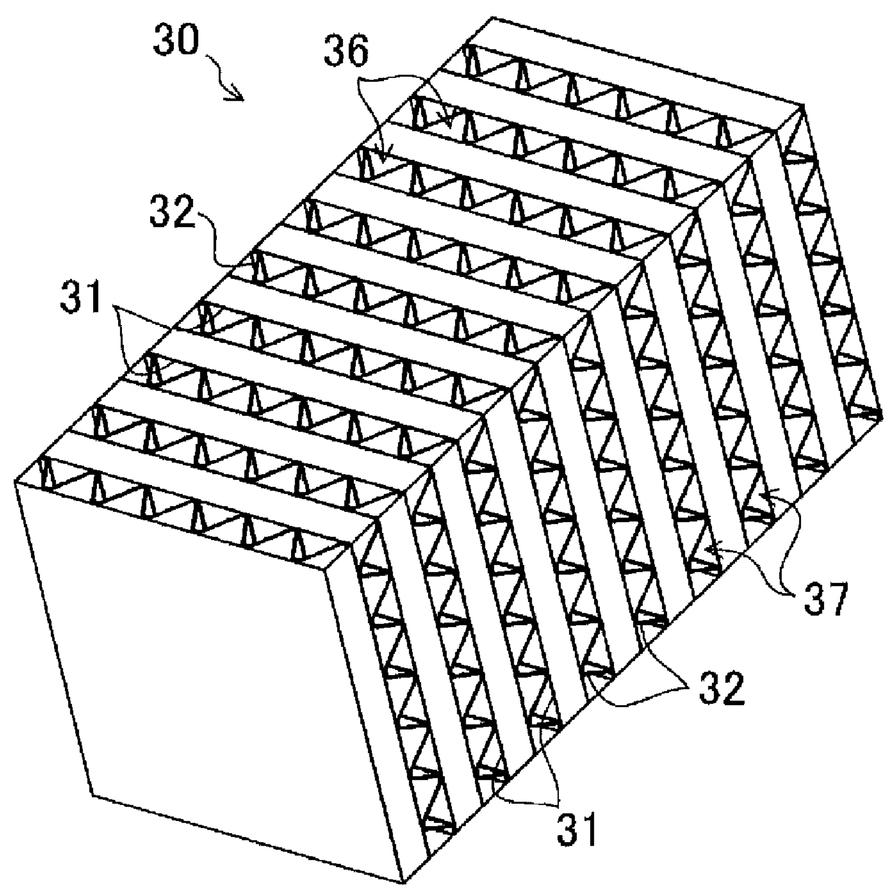
FIG. 2 is a schematic perspective view illustrating a total heat exchange element of the first embodiment of the present disclosure.
Figure 3:
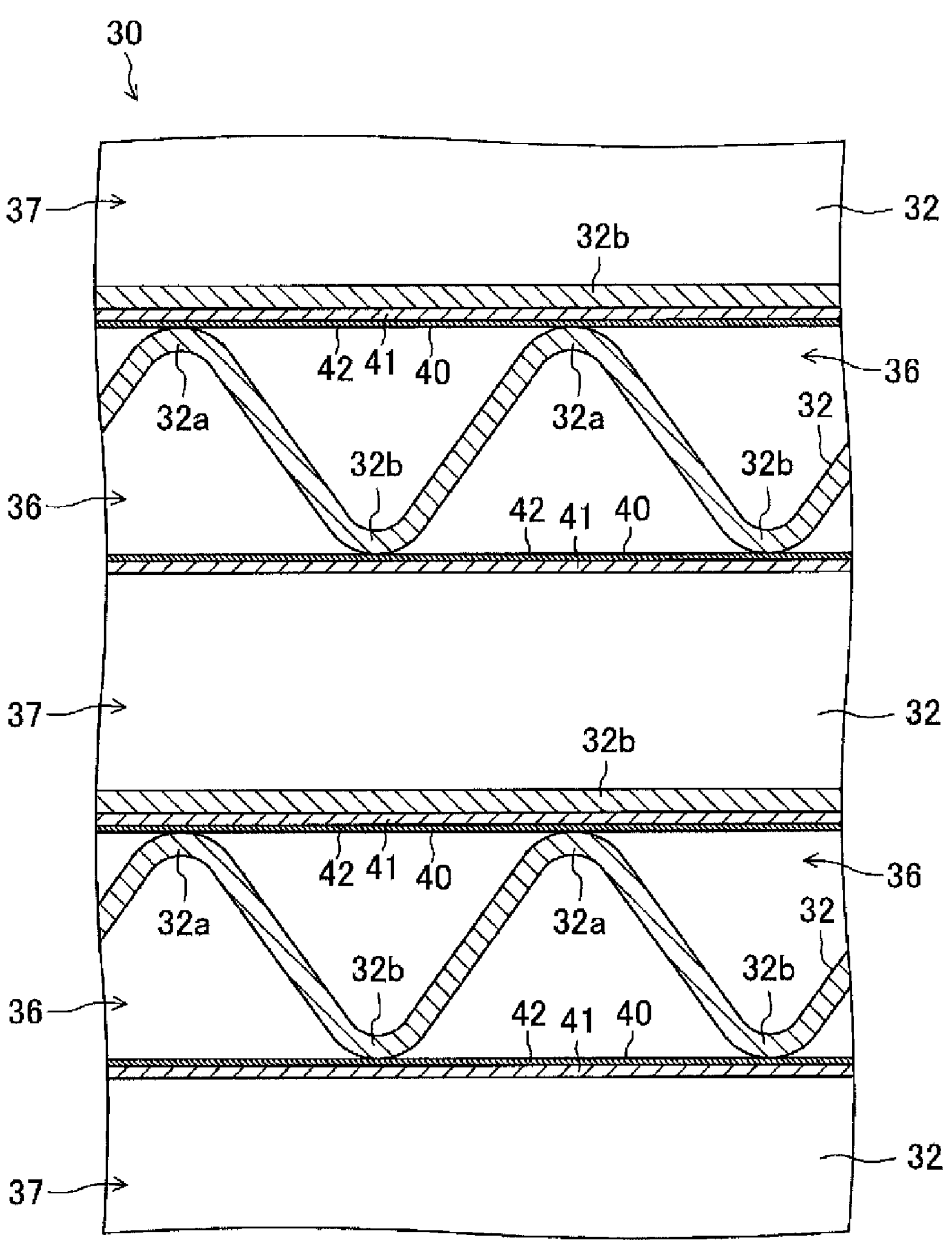
FIG. 3 is a cross-sectional view illustrating a main part of a total heat exchange element of the first embodiment of the present disclosure.

As illustrated in FIGS. 2 and 3, in the first embodiment of the present disclosure, a total heat exchange element (30) is a cross-flow type heat exchanger in which a plurality of first air flow paths (36) and a plurality of second air flow paths (37) are formed. The total heat exchange element (30) is provided with a plurality of partition members for total heat exchange element (40) and a plurality of spacing members (32), and the total heat exchange element (30) as a whole is formed into a quadrangular prism shape.

In the total heat exchange element (30), a plurality of the partition members (40) and a plurality of the spacing members (32) are laminated alternately. In the total heat exchange element (30), a space between the adjacent partition members (40) is maintained substantially constant by the spacing member (32).

In the total heat exchange element (30), the first air flow paths (36) and the second air flow paths (37) are alternately formed in the lamination direction of the partition members (40) and the spacing members (32). The adjacent first air flow path (36) and second air flow path (37) are partitioned by the partition member (40).

The partition member (40) constituting the total heat exchange element (30) of the present embodiment is formed into a roughly square shape in a plan view. In the total heat exchange element (30) of the present embodiment, the moisture-permeable membranes (42) of all the partition members (40) face the first air flow paths (36) (see FIG. 3).

The spacing member (32) is a corrugated plate-shaped member formed into a roughly square shape in a plan view. A plurality of peak portions (32*a*) having linear ridges and a plurality of valley portions (32*b*) having linear ridges are formed on the spacing member (32). The ridges of the peak portions (32*a*) and the ridges of the valley portions (32*b*) are substantially parallel to each other. In addition, the peak portions (32*a*) and the valley portions (32*b*) are alternately formed in the spacing member (32). The spacing member (32) maintains a space between the partition members (40) disposed on both sides of the spacing member (32).

In the total heat exchange element (30), the spacing members (32) that are adjacent to each other and are sandwiching the partition member (40) are disposed in an orientation in which the directions of the ridges of the waveforms of the spacing members (32) are substantially orthogonal to each other. As a result, in the total heat exchange element (30), the first air flow paths (36) open on a pair of opposing sides of the total heat exchange element (30) while the second air flow paths (37) open on the remaining pair of opposing sides.

In the total heat exchange element (30), the air flowing through the first air flow paths (36, 121) are different from the air flowing through the second air flow paths (37, 151). For example, in the total heat exchange element (30) disposed in a ventilation device, the outdoor air (supply air) supplied to the indoor flows through the first air flow paths (36, 121) while the room air (exhaust air) exhausted to the outdoor flows through the second air flow paths (37, 151). In the total heat exchange element (30), sensible heat and latent heat (moisture) are exchanged between the air flowing through the first air flow paths (36, 121) and the air flowing through the second air flow paths (37, 151).

In the total heat exchange element (30) of the present embodiment, the first air flow paths (36, 121) and the second air flow paths (37, 151) are partitioned by the partition members (40). As such, the total heat exchange element (30) of the present embodiment has a low air permeability between the first air flow paths (36, 121) and the second air flow paths (37, 151) and a high moisture permeability (in particular, moisture permeability in a low temperature and low humidity environment) between the first air flow paths (36, 121) and the second air flow paths (37, 151). Furthermore, the total heat exchange element (30) of the present embodiment has a high water resistance.

Total Heat Exchange Element

Figure 4:
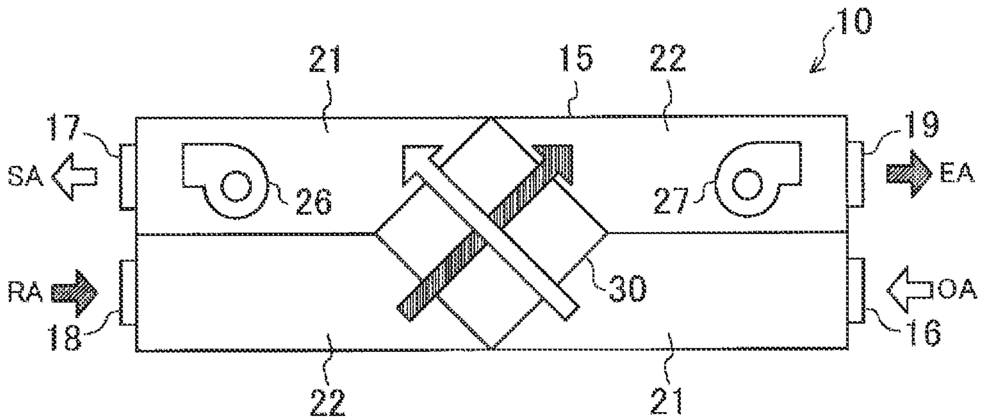
FIG. 4 is a schematic configuration diagram illustrating a ventilation device of the first embodiment of the present disclosure.

As illustrated in FIG. 4, in the first embodiment of the present disclosure, the ventilation device (10) is provided with a casing (15) that houses the total heat exchange element (30). The casing (15) is provided with an outdoor air intake port (16), a supply air port (17), a room air intake port (18), and an exhaust air port (19). Also, a supply air side passage (21) and an exhaust air side passage (22) are formed in the internal space of the casing (15). The supply air side passage (21) is connected with the outdoor air intake port (16) at one end and the supply air port (17) at the other end. The exhaust air side passage (22) is connected with the room air intake port (18) at one end and the exhaust air port (19) at the other end.

The total heat exchange element (30) is arranged to cross the supply air side passage (21) and the exhaust air side passage (22). Also, the total heat exchange element (30) is installed in the casing (15) in a state in which the first air flow paths (36) communicate with the supply air side passage (21) while the second air flow paths (37) communicate with the exhaust air side passage (22).

The ventilation device (10) is further provided with a supply air fan (26) and an exhaust air fan (27). The supply air fan (26) is disposed on the downstream side [that is, the supply air port (17) side] of the total heat exchange element (30) in the supply air side passage (21). The exhaust air fan (27) is disposed on the downstream side [that is, the exhaust air port (19) side] of the total heat exchange element (30) in the exhaust air side passage (22).

In the ventilation device (10), the outdoor air flows through the supply air side passage (21) towards the indoor, and the outdoor air flows through the exhaust air side passage (22) towards the outdoor. The indoor air flowing through the supply air side passage (21) and the indoor air flowing through the exhaust air side passage (22) exchange sensible heat and latent heat (moisture) in the total heat exchange element (30).

Total Heat Exchange Element and Ventilation Device (Second Embodiment)

In the second embodiment of the present disclosure, similar to the total heat exchange element (30) of the first embodiment, the total heat exchange element (30) of the present embodiment is provided in the ventilation device (10) of the first embodiment to exchange sensible heat and latent heat (moisture) between the supply air and the exhaust air.

Configuration of Total Heat Exchange Element

Figure 5:
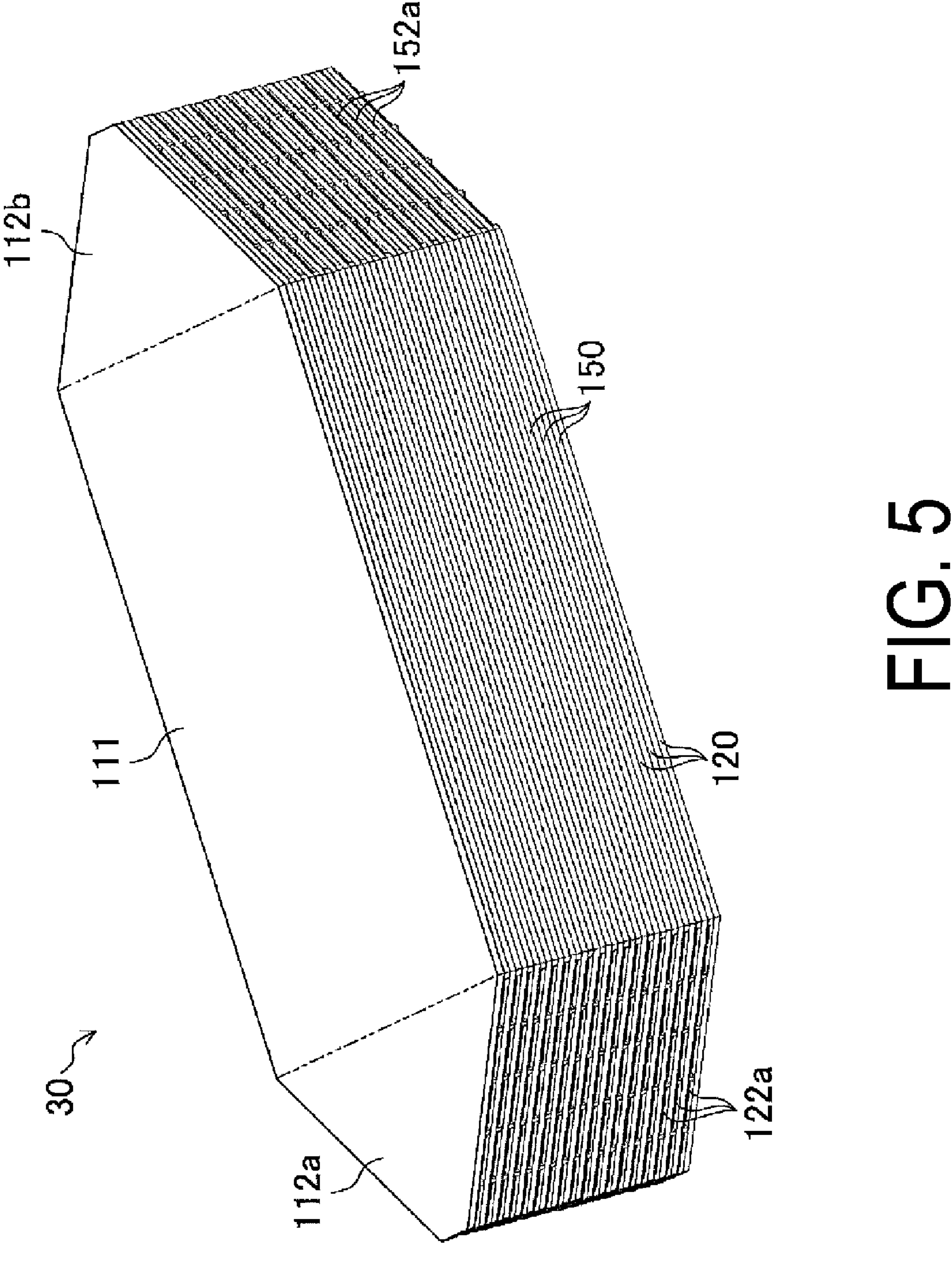
FIG. 5 is a perspective view illustrating a total heat exchange element of the second embodiment of the present disclosure.

As illustrated in FIG. 5, the total heat exchange element (30) is formed in a columnar shape having a polygonal end face. The end face of the total heat exchange element (30) of the present embodiment is an elongated octagonal shape. As also illustrated in FIG. 6, one main heat exchange portion (111) and two auxiliary heat exchange portions (112*a*, 112*b*) are formed in the total heat exchange element (30).

Figure 6:
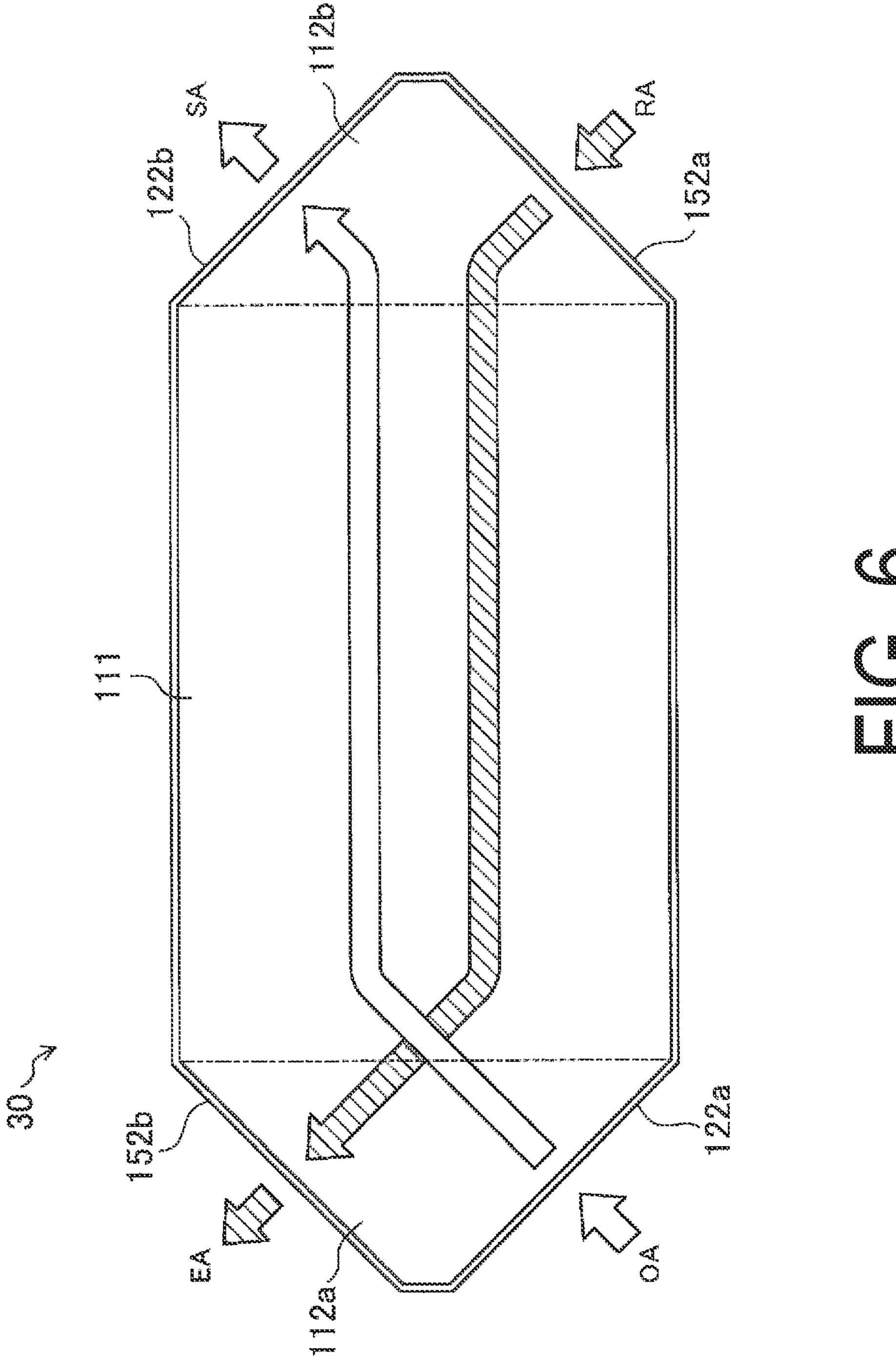
FIG. 6 is a plan view illustrating a total heat exchange element of the second embodiment of the present disclosure.

The main heat exchange portion (11*l*) is located in the center of the total heat exchange element (30) in the left-right direction in FIG. 6. In a plan view of the total heat exchange element (30) illustrated in FIG. 6, the main heat exchange portion (111) is an elongated rectangular portion. The auxiliary heat exchange portions (112*a*, 112*b*) are located on the sides in the left and right directions of the main heat exchange portion (111) of the total heat exchange element (30) in FIG. 6. In the total heat exchange element (30), each of the auxiliary heat exchange portions (112*a*, 112*b*) is disposed on each of the two sides in the left and right directions of the main heat exchange portion (111) in FIG. 6. In the plan view of the total heat exchange element (30) illustrated in FIG. 6, each of the auxiliary heat exchange portions (112*a*, 112*b*) is a trapezoidal portion.

The total heat exchange element (30) is provided with a plurality of first elements (120) and a plurality of second elements (150). In the total heat exchange element (30), the first elements (120) and the second elements (150) overlap alternately. The first elements (120) form a first air flow path (121). The first air flow path (121) is a flow path through which supply air flows. The second elements (150) form a second air flow path (151). The second air flow path (151)

is a flow path through which exhaust air flows. In the total heat exchange element (30), the first air flow paths (121) and the second air flow paths (151) are alternately formed in the lamination direction of the first elements (120) and the second elements (150).

A first inflow port (122*a*), a first outflow port (122*b*), a second inflow port (152*a*), and a second outflow port (152*b*) are formed on the sides of the total heat exchange element (30) [the side along the lamination direction of the first elements (120) and the second elements (150)]. The first inflow port (122*a*) and the first outflow port (122*b*) are formed in the first elements (120) and communicate with the first air flow paths (121). The second inflow port (152*a*) and the second outflow port (152*b*) are formed in the second elements (150) and communicate with the second air flow paths (151).

Figure 7:
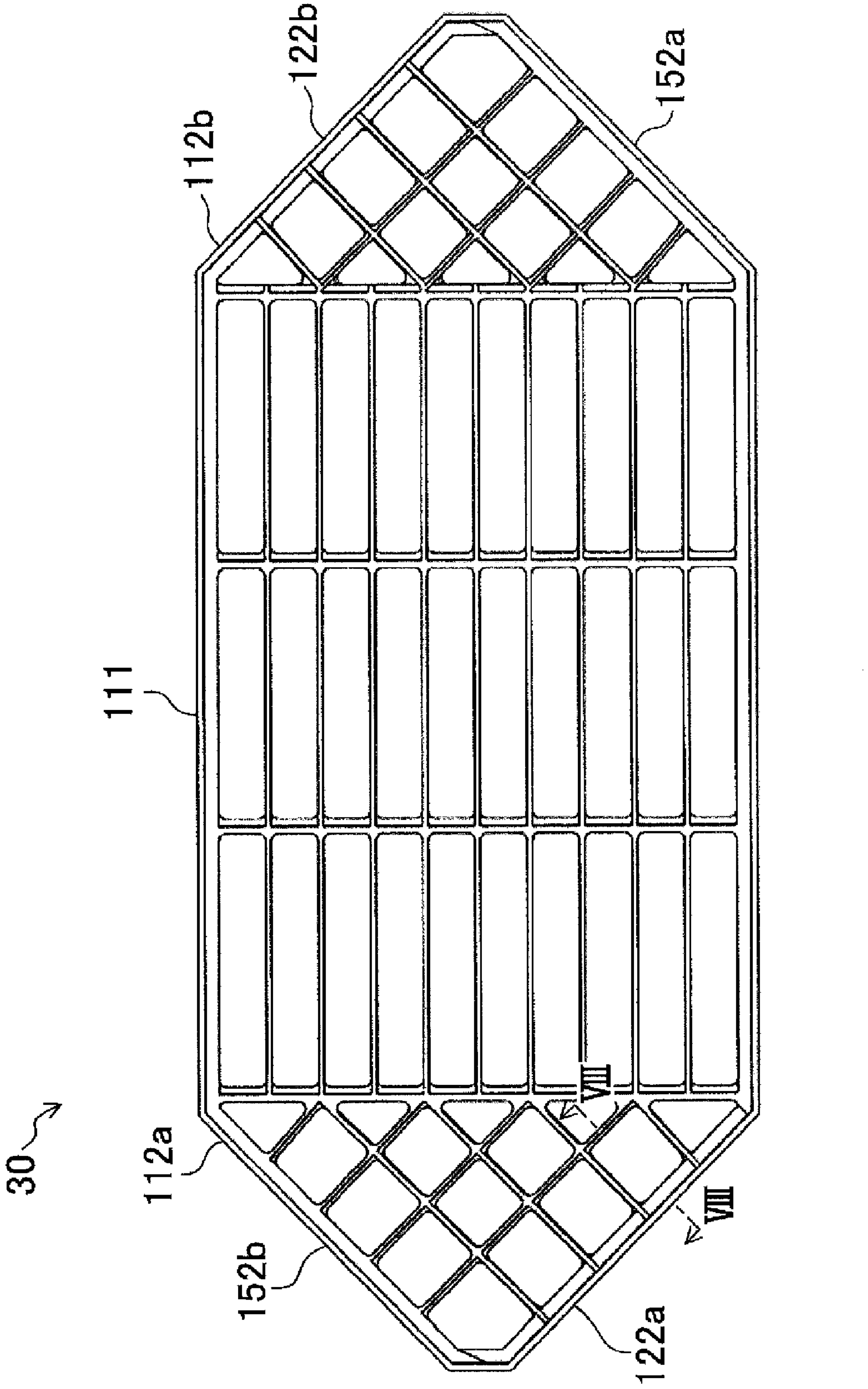
FIG. 7 is a plan view illustrating a part of a total heat exchange element of the second embodiment of the present disclosure.

As also shown in FIGS. 6 and 7, the first inflow port (122*a*), the first outflow port (122*b*), the second inflow port (152*a*), and the second outflow port (152*b*) are each formed on a different side of the total heat exchange element (30). In one auxiliary heat exchange portion (112*a*) of the total heat exchange element (30), the first inflow port (122*a*) is opened on one side, and the second outflow port (152*b*) is opened on another side. In the other auxiliary heat exchange portion (112*b*) of the total heat exchange element (30), the first outflow port (122*b*) is opened on one side, and the second inflow port (152*a*) is opened on another side.

Figure 8:
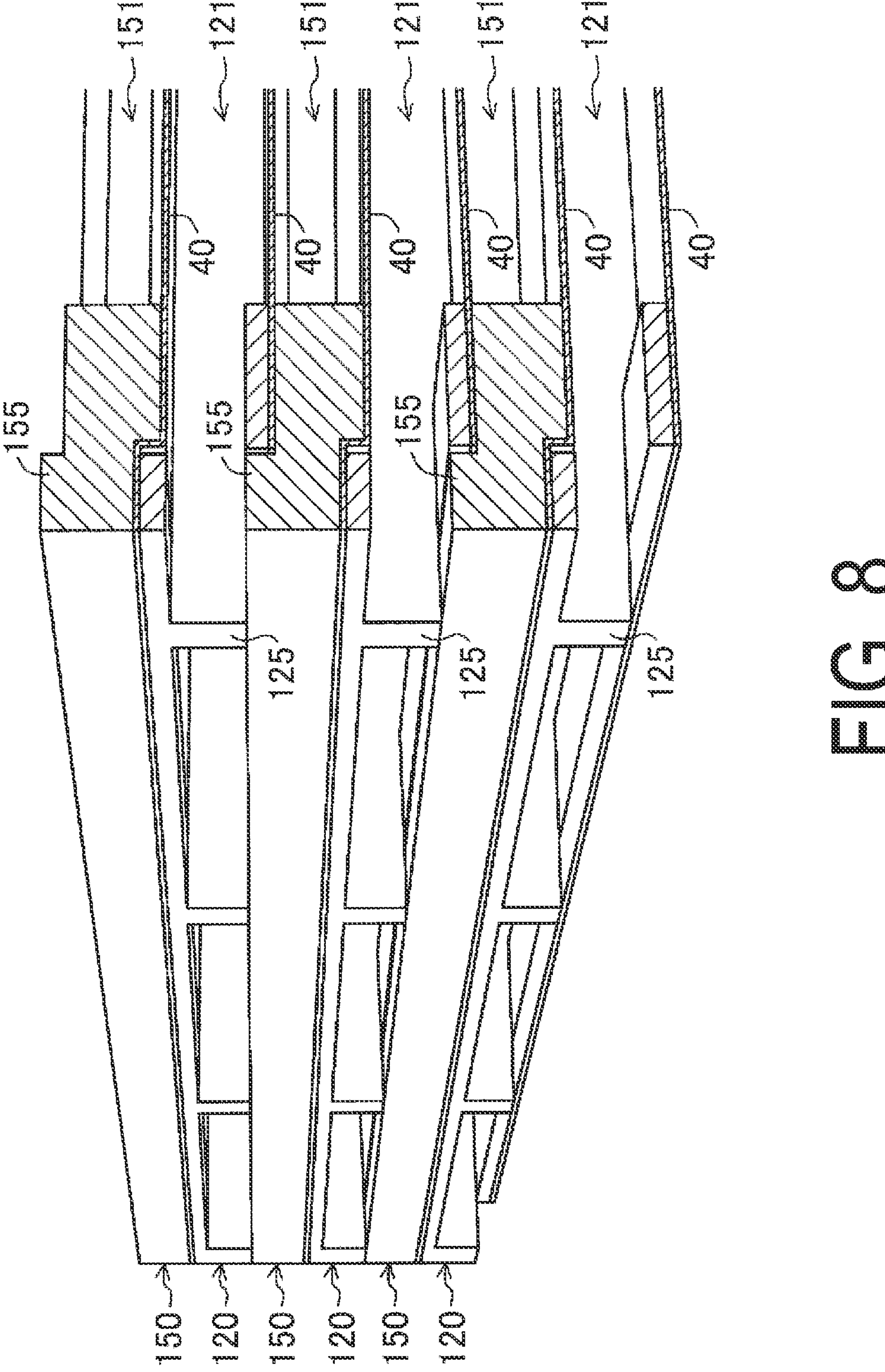
FIG. 8 is a perspective view illustrating a cross-section taken along a line VIII-VIII in FIG. 7 and a periphery of the cross-section.

As shown in FIG. 8, the first element (120) is provided with a first frame (125) and the partition member (40), and second element (150) is provided with a second frame (155) and the partition member (40).

The first frame (125) and the second frame (155) are each a flat member made of resin formed by injection molding. The first frame (125) and the second frame (155) are spacing members that maintain a space between the adjacent partition members (40). The first frame (125) and the second frame (155) are each formed into an elongated octagonal shape in a plan view (see FIG. 7). The outer shape of each frame (125, 155) in a plan view is substantially the same as the shape of the end face of the total heat exchange element (30).

In the first element (120), the partition member (40) covers substantially the entire one side (the lower side in FIG. 8) of the first frame (125). In the first element (120), the partition member (40) is adhered to the first frame (125) in a state in which the moisture-permeable membrane (42) is facing the first frame (125) side. In the first element (120), the moisture-permeable membrane (42) of the partition member (40) faces the first air flow paths (121) formed by the first element (120).

In the second element (150), the partition member (40) covers substantially the entire one side (the lower side in FIG. 8) of the second frame (155). In the second element (150), the partition member (40) is adhered to the second frame (155) in a state in which the second side (41*b*) of the porous substrate (41) is facing the second frame (155) side. In the second element (150), the moisture-permeable membrane (42) of the partition member (40) faces the first air flow paths (121) formed by the first element (120) adjacent to the second element (150).

Air Flow and Heat Exchange Action

As illustrated in FIG. 6, in the total heat exchange element (30), the outdoor air OA flows into the first inflow port (122*a*), and the room air RA flows into the second inflow port (152*a*). The outdoor air OA that has flowed into the first inflow port (122*a*) flows through the first air flow paths (121) as supply air, passes through one auxiliary heat exchange portion (112*a*), the main heat exchange portion (111), and the other auxiliary heat exchange portion (112*b*) in this order, and then flows out from the first outflow port (122*b*) and is supplied into the room. The room air RA that has flowed into the second inflow port (152*a*) flows through the second air flow paths (151) as exhaust air, passes through the other auxiliary heat exchange portion (112*b*), the main heat exchange portion (111), and one auxiliary heat exchange portion (112*a*), and then flows out from the second outflow port (152*b*) and is exhausted to the outdoor.

In each of the auxiliary heat exchange portions (112*a*, 112*b*) of the total heat exchange element (30), the supply air flowing through the first air flow paths (121) and the exhaust air flowing through the second air flow paths (151) flow in directions intersecting each other. In the main heat exchange portion (111) of the total heat exchange element (30), the supply air flowing through the first air flow paths (121) and the exhaust air flowing through the second air flow paths (151) flow in directions opposite to each other.

In the total heat exchange element (30), sensible heat and latent heat (moisture) are exchanged between the supply air flowing through the first air flow paths (121) and the exhaust air flowing through the second air flow paths (151). In the total heat exchange element (30), heat is transferred between the supply air and the exhaust air, from whichever having the higher temperature to whichever having the lower temperature. Also, in the total heat exchange element (30), moisture is transferred between the supply air and the exhaust air, from whichever having the higher humidity to whichever having the lower humidity.

In the total heat exchange element (30) of the present embodiment, sensible heat and latent heat are exchanged between the supply air flowing through the first air flow paths (121) and the exhaust air flowing through the second air flow paths (151) primarily at the main heat exchange portion (111). As such, the total heat exchange element (30) of the present embodiment is a counter-flow type heat exchanger.

Modification of Partition Member for Total Heat Exchange Element (Laminate) and Total Heat Exchange Element The configuration of the partition member for total heat exchange element (laminate) and the total heat exchange element is not limited to the configurations of the second and third embodiments.

Partition Member for Total Heat Exchange Element (Laminate)

Figure 9:
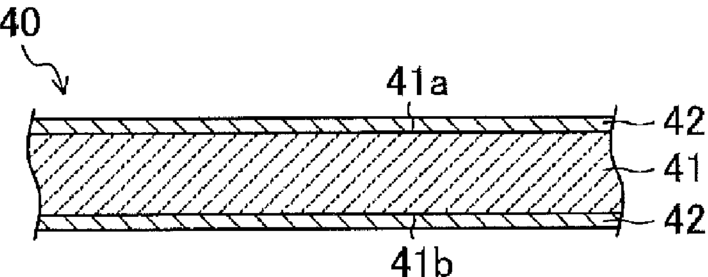
FIG. 9 is a schematic cross-sectional view illustrating a modification of a partition member for total heat exchange element of the present disclosure.

For example, the partition member (laminate) (40) illustrated in FIG. 9 is provided with one porous substrate (41) and two moisture-permeable membranes (42). In the partition member (laminate) (40), one moisture-permeable membrane (42) covers the first side (41*a*) of the partition member (laminate) (40), and the other moisture-permeable membrane (42) covers the second side (41*b*) of the partition member (laminate) (40).

Figure 10:
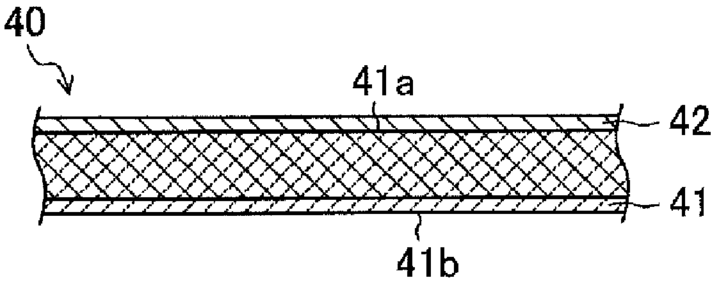
FIG. 10 is a schematic cross-sectional view illustrating a modification of a partition member for total heat exchange element of the present disclosure.

Furthermore, in the partition member (laminate) (40) illustrated in FIG. 10, a portion of the moisture-permeable membrane (42) has penetrated into the porous substrate (41). When producing this partition member (laminate) (40), the aqueous composition for forming the moisture-permeable membrane (42) permeates into the inner part of the porous substrate (41). Also, in this partition member (laminate) (40), a portion of the moisture-permeable membrane (42) covers the first side (41*a*) of the porous substrate (41) while the remaining portion penetrates into the inner part of the porous substrate (41).

Figure 11:
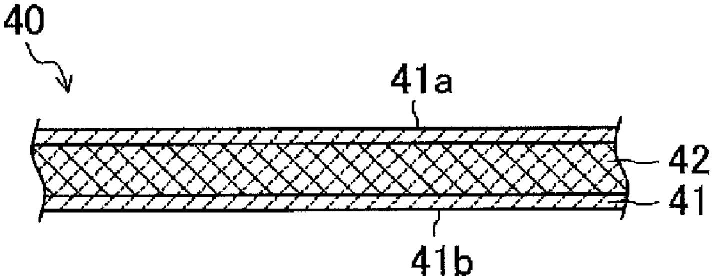
FIG. 11 is a schematic cross-sectional view illustrating a modification of a partition member for total heat exchange element of the present disclosure.

Further, in the partition member (laminate) (40) illustrated in FIG. 11, the entire moisture-permeable membrane (42)

has penetrated into the porous substrate (41). When producing this partition member (laminate) (40), the aqueous composition for forming the moisture-permeable membrane (42) is injected into the inner part of the porous substrate (41). In this partition member (laminate) (40), the moisture-permeable membrane (42) is formed in a central portion in the thickness direction of the porous substrate (41).

Figure 12:
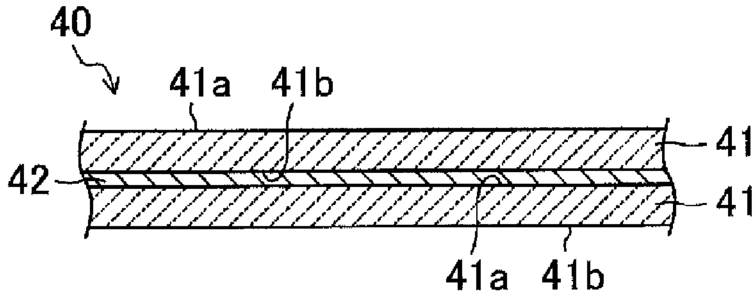
FIG. 12 is a schematic cross-sectional view illustrating a modification of a partition member for total heat exchange element of the present disclosure.

Further, the partition member (laminate) (40) illustrated in FIG. 12 is provided with two porous substrates (41) and one moisture-permeable membrane (42). In this partition member (laminate) (40), each of the porous substrates (41) is provided on each of the two sides of the moisture-permeable membrane (42) in the thickness direction. One side of the moisture-permeable membrane (42) of this partition member (laminate) (40) is in contact with the first side (41*a*) of the one porous substrate (41), and the other side of the moisture-permeable membrane (42) of this partition member (laminate) (40) is in contact with the second side (41*b*) of the other porous substrate (41).

Total Heat Exchange Element

Figure 13:
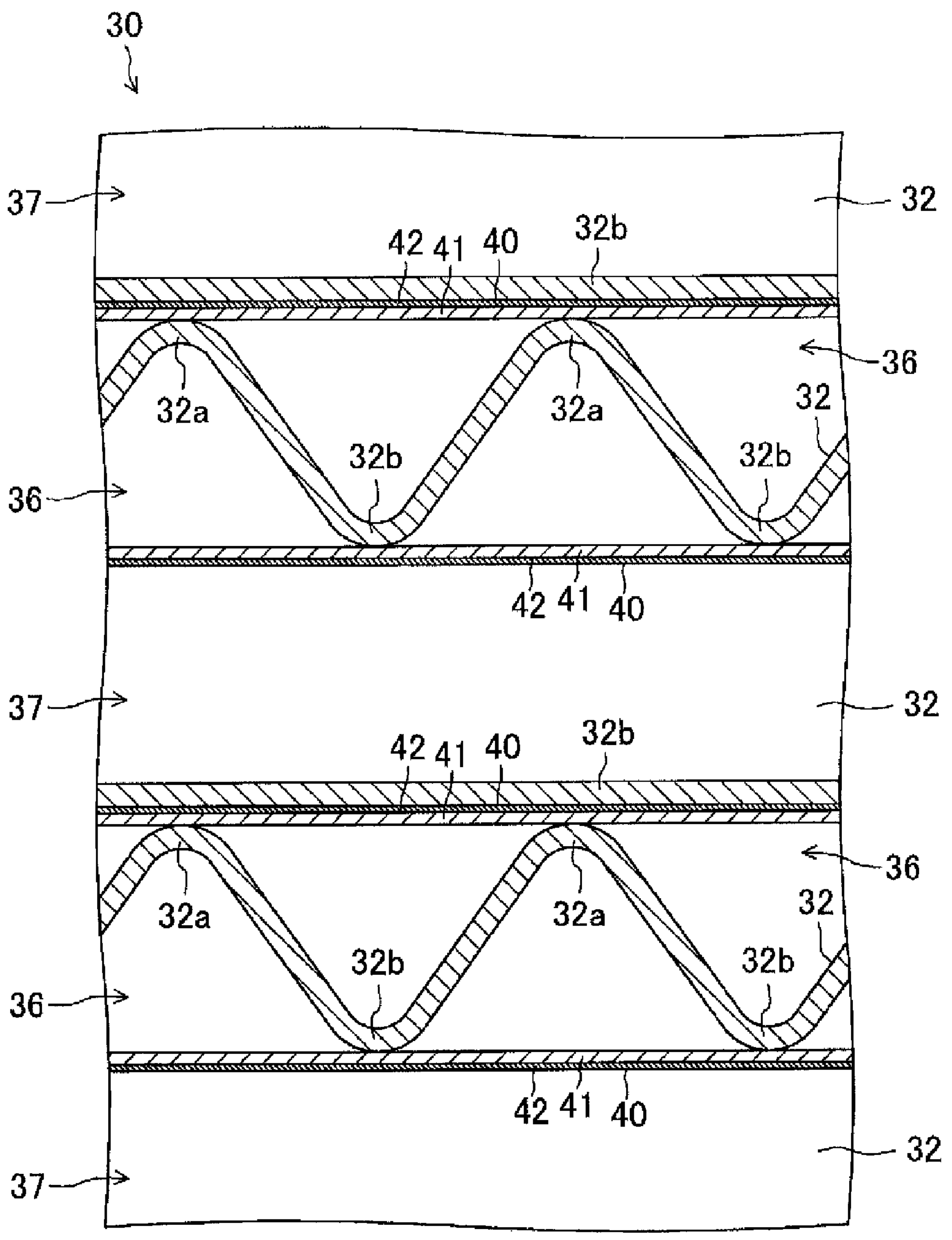
FIG. 13 is a cross-sectional view equivalent to FIG. 3 of a modification of a total heat exchange element of the present disclosure.

As illustrated in FIG. 13, in the total heat exchange element (30), the moisture-permeable membranes (42) of all the partition members (laminates) (40) may face the second air flow paths (37, 151). Note that FIG. 13 illustrates a case in which the present modification is applied to the total heat exchange element (30) of the first embodiment.

In the total heat exchange element (30) of the present modification, the second side (41*b*) of the porous substrate (41) of the partition member (40) faces the first air flow paths (36, 121) through which the supply air flows, and the moisture-permeable membrane (42) of the partition member (40) faces the second air flow paths (37, 151) through which the exhaust air flows.

Further, in the total heat exchange element (30), the partition member (40) in which the moisture-permeable membrane (42) faces the first air flow paths (36, 121) may be mixed with the partition member (40) in which the moisture-permeable membrane (42) faces the second air flow paths (37, 151).

Figure 14:
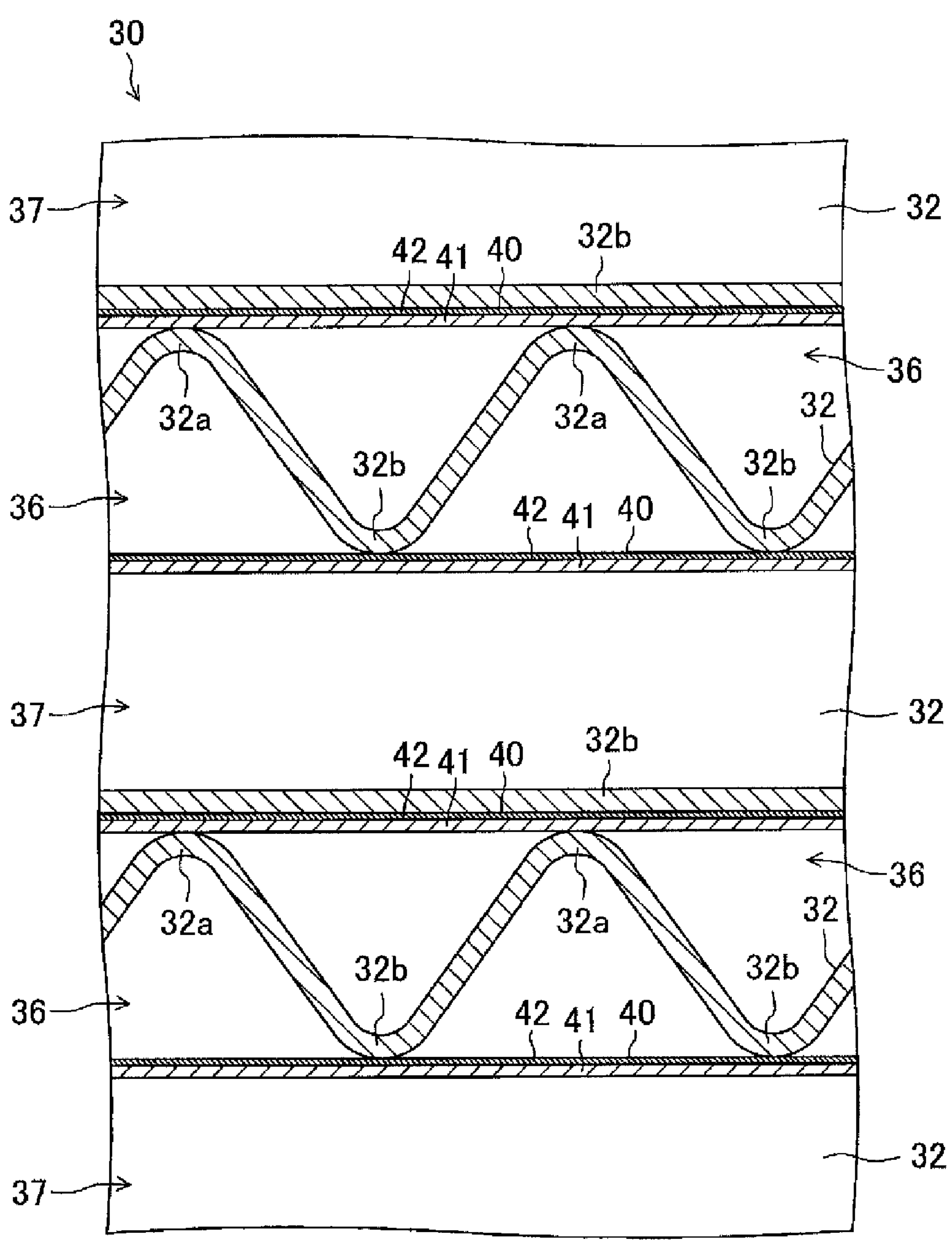
FIG. 14 is a cross-sectional view equivalent to FIG. 3 of a modification of a total heat exchange element of the present disclosure.

For example, in the total heat exchange element (30) illustrated in FIG. 14, the partition member (40) in which the moisture-permeable membrane (42) faces the first air flow paths (36, 121) and the partition member (40) in which the moisture-permeable membrane (42) faces the second air flow paths (37, 151) are alternately disposed in the lamination direction of the partition members (40) and the spacing members (32125, 155). Note that FIG. 14 illustrates a case in which the present modification is applied to the total heat exchange element (30) of the second embodiment.

Each aspect disclosed in the present specification can be combined with any other feature disclosed herein. Note that each of the configurations, combinations thereof, or the like in each of the embodiments are examples, and additions, omissions, replacements, and other changes to the configurations may be made as appropriate without departing from the spirit of the present disclosure. In addition, each aspect of the invention according to the present disclosure is not limited by the embodiments or the following examples but is limited only by the claims.

EXAMPLES

An embodiment of the present invention will be described in further detail below based on examples.

Example 1

A random copolymer of 2-methacryloyloxyethyl phosphorylcholine and stearyl methacrylate [ratio of constituent units (former/latter): 1/1, concentration: 4 mass %, weight average molecular weight: 100000) and a preservative were mixed and diluted with distilled water, resulting in a composition having a copolymer concentration of 2 mass % (with the copolymer being the main component in the solid content). Meanwhile, the surface of one side of a porous substrate made of a polyolefin-based resin (thickness: 20 μm surface tension: 32 dyn) was subjected to a corona treatment, resulting in a hydrophilic surface having a surface tension of 46 dyn. Then, the hydrophilic surface of the porous substrate was coated with the composition described above using an applicator, and heating was performed at 50° C. for 3 minutes, resulting in a moisture-permeable membrane (thickness, from 100 to 500 nm). In this way, the laminate of Example 1 was produced.

Example 2

The laminate of Example 2 was produced in the same manner as in Example 1 except that a porous substrate made of a polyolefin-based resin (thickness: 12 μm, surface tension: 32 dyn) was used as the porous substrate.

Example 3

The laminate of Example 3 was produced in the same manner as in Example 1 except that a porous substrate made of a polyolefin-based resin (thickness: 25 μm, surface tension: 32 dyn) was used as the porous substrate.

Example 4

The laminate of Example 4 was produced in the same manner as in Example 1 except that a porous substrate made of a polyolefin-based resin (thickness: 5 μm, surface tension: 32 dyn) was used as the porous substrate.

Example 5

A random copolymer of 2-methacryloyloxyethyl phosphorylcholine and stearyl methacrylate [ratio of constituent units (former/latter): 1/1, concentration: 4 mass %, weight average molecular weight: 100000) and a preservative were mixed and diluted with distilled water, resulting in a composition having a copolymer concentration of 1.5 mass % (with the copolymer being the main component in the solid content). The laminate of Example 5 was produced in the same manner as in Example 1 except that the moisture-permeable membrane was formed using this composition.

Example 6

A random copolymer of 3-[2-(methacryloyloxy)ethyl] dimethylammonium propionate and lauryl acrylate [ratio of constituent units (former/latter): 40/60, concentration: 10 mass %, weight average molecular weight: 80000) and a preservative were mixed and diluted with distilled water, resulting in a composition having a copolymer concentration of 4 mass % (with the copolymer being the main component in the solid content). The laminate of Example 6 was produced in the same manner as in Example 1 except that the moisture-permeable membrane was formed using this composition.

Example 7

A random copolymer of 3-[(2-methacryloylamino)propyl] dimethyl-3-sulfobutylammonium hydroxide salt and N-dodecylmethacrylamide [ratio of constituent units (former/latter): 30/70, concentration: 50 mass %, weight average molecular weight: 80000) and a preservative were mixed and diluted with distilled water, resulting in a composition having a copolymer concentration of 2 mass % (with the copolymer being the main component in the solid content). The laminate of Example 7 was produced in the same manner as in Example 1 except that the moisture-permeable membrane was formed using the composition.

Comparative Example 1

A partition member for total heat exchange element contained in a commercially available total heat exchanger was retrieved and used as the laminate of Comparative Example 1. Note that the laminate had paper (thickness: 40 μm) as the porous substrate, and the porous substrate had been soaked in an inorganic salt having deliquescency as a moisture permeability improving component.

Comparative Example 2

Paper was coated with a polyurethane-based resin solution (trade name "SANPRENE H-600", available from Sanyo Chemical Industries, Ltd., concentration: 8 mass %) using an applicator, and heating was performed at 120° C. for 3 minutes, resulting in a moisture-permeable membrane. In this way, the laminate of Comparative Example 2 was produced.

EVALUATION

Each of the laminates obtained in Examples and Comparative Examples was evaluated as follows. The evaluation results are listed in a table. Note that the symbol "-" in the table indicates that evaluation was not performed. Furthermore, a porous substrate made of a polyolefin-based resin on which a moisture-permeable membrane was not formed was evaluated as Comparative Example 3.

(1) Air Resistance

The air resistance of the laminates obtained in Examples and Comparative Examples was measured based on the Gurley method according to JAS P8117-2009. Specifically, a 5 cm×5 cm test piece was cut out from the laminates obtained in Examples and Comparative Examples and placed in a Gurley device, and the number of seconds needed to pass 100 cc of air was measured with a stopwatch.

(2) Moisture Permeability

The moisture permeability of the laminates obtained in Examples and Comparative Examples was measured based on the moisture permeability testing method (the cup method) according to JIS Z0208-1976. Specifically, the laminates obtained in Examples and Comparative Examples were left in a measurement environment for two hours or more, and then used as a moisture permeable sheet to cover the moisture permeable cup to achieve airtightness. Then, the increase in the total mass of calcium chloride and the moisture permeable cup in an environment with substantially no wind (a wind speed of 0.2 m/s or less) after 1 hour was converted into a mass per 1 $m^2$·24 hours of the test piece and measured as the moisture permeability. Note that measurements were separately performed in two environments, one with a temperature of 20° C., and a relative humidity of 65%, the other with a temperature of 5° C., and a relative humidity of 45%.

(3) Maximum Diameter of Hydrophilic Portion

For the laminates obtained in Examples, using an image of the moisture-permeable membrane surface and the adhesion measurement mode of a scanning probe microscope (SPM) (model "Dimension Icon", available from Bruker), a portion with high adsorption (hydrophilic portion) and a portion with low adsorption (hydrophobic portion) were quantified based on the adhesion; the values were processed by an image analysis software, and in this way, the size of the hydrophilic portion was calculated in the form of an equivalent spherical diameter, and the maximum diameter of the hydrophilic portion was calculated.

TABLE 1

| | Air resistance [second/100 cc] | Moisture permeability at 20° C. and 65% RH [g/($m^2$ · 24 h)] | Moisture permeability at 5° C. and 45% RH [g/($m^2$ · 24 h)] | Maximum diameter of hydrophilic portion [nm] |
|---|---|---|---|---|
| Example 1 | 10000 and more | 1900 | 500 | 17 |
| Example 2 | 7000 | 2300 | 540 | — |
| Example 3 | 7000 | 2300 | 530 | — |
| Example 4 | 10000 and more | 2200 | — | — |
| Example 5 | 5000 | 2400 | — | — |
| Example 6 | 10000 and more | 2200 | — | 20 |
| Example 7 | 10000 and more | 2300 | — | — |
| Comparative Example 1 | 3000 | 1500 | 290 | — |
| Comparative Example 2 | 2500 | 1800 | — | — |
| Comparative Example 3 | 200 | 2300 | — | — |

The laminates of Examples were evaluated to have high air resistance, meaning low air permeability, and excellent moisture permeability. In particular, the moisture permeability of the laminates of Examples in an environment with a temperature of 5° C. and a relative humidity of 45% was 500 g/($m^2$·24 h) or greater (Examples 1 to 3), and the laminates of Examples were evaluated to have excellent moisture permeability in a low temperature and low humidity environment. Meanwhile, the laminate of Comparative Example 1 was evaluated to have poor moisture permeability. Further, the laminate of Comparative Example 2 was evaluated to have high air permeability and inferior moisture permeability. In addition, in Comparative Example 3 in which only a porous substrate was used, moisture permeability was excellent, but air permeability was high.

Hereinafter, variations of the invention according to the present disclosure will be described.

[Appendix 1] A laminate including a porous substrate and a moisture-permeable membrane disposed on at least one side of the porous substrate, the moisture-permeable membrane including a thermoplastic copolymer having a side chain containing a hydrophilic group which is a functional group.

[Appendix 2] The laminate according to Appendix 1, wherein the hydrophilic group is a betaine group.

[Appendix 3] The laminate according to Appendix 1 or 2, wherein a portion of the moisture-permeable membrane has penetrated into the porous substrate.

[Appendix 4] The laminate according to Appendix 1 or 2, wherein all of the moisture-permeable membrane has penetrated into the porous substrate.

[Appendix 5] The laminate according to Appendices 1 to 4, wherein one porous substrate is provided on each of the two sides of the moisture-permeable membrane in the thickness direction.

[Appendix 6] The laminate according to Appendices 1 to 5, wherein the copolymer contains a constituent unit represented by Formula (1) above as a constituent unit having the side chain containing the betaine group.

[Appendix 7] The laminate according to Appendices 1 to 6, wherein the copolymer further has a hydrophobic functional group in a side chain.

[Appendix 8] The laminate according to Appendix 7, wherein the copolymer contains a constituent unit represented by Formula (2) above as a constituent unit having the hydrophobic functional group in the side chain.

[Appendix 9] The laminate according to Appendix 8, wherein a molar ratio of the constituent unit represented by Formula (1) to the constituent unit represented by Formula (2) in the copolymer is from 1/100 to 100/1.

[Appendix 10] The laminate according to Appendix 8 or 9, wherein in Formula (1) above, $R^1$ is a hydrogen atom or a methyl group (preferably a methyl group).

[Appendix 11] The laminate according to any one of Appendices 8 to 10, wherein the constituent unit represented by Formula (1) above is a constituent unit derived from an acrylate or a methacrylate.

[Appendix 12] The laminate according to any one of Appendices 8 to 11, wherein X in Formula (1) above is a linear or branched alkylene group having from 1 to 4 carbons (preferably a linear alkylene group having from 1 to 4 carbons).

[Appendix 13] The laminate according to any one of Appendices 8 to 12, wherein Y in Formula (1) above is an alkylene group having from 1 to 4 carbons (preferably a linear alkylene group having from 1 to 4 carbons).

[Appendix 14] The laminate according to any one of Appendices 8 to 13, wherein the cation in Formula (1) above is an ammonium ion.

[Appendix 15] The laminate according to any one of Appendices 8 to 14, wherein the anion in Formula (1) above is a phosphate ion, a sulfate ion, or a carbonate ion.

[Appendix 16] The laminate according to any one of Appendices 8 to 15, wherein Formula (1) above contains a group represented by Formula (1-1) above, a group represented by Formula (1-2) above, or a group represented by Formula (1-3) above.

[Appendix 17] The laminate according to Appendix 16, wherein in Formula (1-1) above, $R^5$, $R^6$, and $R^7$ are a methyl group.

[Appendix 18] The laminate according to Appendix 16 or 17, wherein in Formula (1-1), X is a dimethylene group and Y is a dimethylene group.

[Appendix 19] The laminate according to any one of Appendices 16 to 18, wherein a monomer forming a constituent unit represented by Formula (1-1) is 2-methacryloyloxyethyl phosphorylcholine.

[Appendix 20] The laminate according to Appendix 16, wherein in Formula (1-2) above, $R^8$ and $R^9$ are a methyl group.

[Appendix 21] The laminate according to Appendix 16 or 20, wherein in Formula (1-2) above, X is a trimethylene group and Y is a tetramethylene group.

[Appendix 22] The laminate according to Appendix 16, wherein in Formula (1-3) above, $R^8$ and $R^9$ are a methyl group.

[Appendix 23] The laminate according to Appendix 16 or 22, wherein in Formula (1-3) above, X is a dimethylene group and Y is a methylene group.

[Appendix 24] The laminate according to any one of Appendices 8 to 23, wherein in Formula (2) above, $R^2$ is a hydrogen atom or a methyl group (preferably a methyl group).

[Appendix 25] The laminate according to any one of Appendices 8 to 24, wherein in Formula (2) above, $R^3$ is a hydrocarbon group (preferably an aliphatic hydrocarbon group, more preferably a linear or branched alkyl group, and even more preferably a linear alkyl group) having from 4 to 26 (preferably from 8 to 22, more preferably from 10 to 20, and even more preferably from 14 to 18) carbons.

[Appendix 26] The laminate according to any one of Appendices 8 to 25, wherein a monomer forming the constituent unit represented by Formula (2) above is stearyl (meth)acrylate.

[Appendix 27] The laminate according to any one of Appendices 8 to 26, wherein a molar ratio of a hydrophilic portion to a hydrophobic portion (the former/the latter) in the copolymer is from 0.01 to 2.0, (preferably from 0.01 to 1.5, and more preferably from 0.01 to 1.3).

[Appendix 28] The laminate according to any one of Appendices 8 to 27, wherein a molar ratio of the constituent unit represented by Formula (1) above to the constituent unit represented by Formula (2) above (the former/the latter) is from 0.01 to 90 (preferably from 0.02 to 80, more preferably from 0.1 to 20, and even more preferably from 0.5 to 5).

[Appendix 29] The laminate according to any one of Appendices 8 to 28, wherein a total number of moles of the constituent unit represented by Formula (1) above and the constituent unit represented by Formula (2) above is 50 mol % or greater (preferably 90 mol % or greater, and more preferably 99 mol % or greater) relative to a total number of moles of constituent units derived from all the monomers constituting the copolymer.

[Appendix 30] The laminate according to any one of Appendices 8 to 29, wherein the copolymer has a weight average molecular weight of from 20000 to 2000000 (preferably from 30000 to 1500000, more preferably from 50000 to 1000000, and even more preferably from 70000 to 500000).

[Appendix 31] The laminate according to any one of Appendices 8 to 30, wherein the copolymer is a random copolymer of a monomer forming the constituent unit represented by Formula (1) above and a monomer forming the constituent unit represented by Formula (2) above.

[Appendix 32] The laminate according to any one of Appendices 1 to 31, wherein the moisture-permeable membrane surface has a structure in which a hydrophilic portion and a hydrophobic portion are phase-separated, and the maximum diameter of the hydrophilic portion on the moisture-permeable membrane surface is 50 nm or less.

[Appendix 33] The laminate according to any one of Appendices 1 to 32, wherein the moisture-permeable membrane contains a preservative having a diameter smaller than a thickness of the moisture-permeable membrane.

[Appendix 34] The laminate according to any one of Appendices 1 to 33, wherein a material that forms the porous substrate is a hydrophobic material (preferably a polyolefin-based resin, and more preferably a polypropylene-based resin).

[Appendix 35] The laminate according to any one of Appendices 1 to 34, wherein the porous substrate has a porosity of from 30 to 90 vol % (preferably from 40 to 70 vol %).

[Appendix 36] The laminate according to any one of Appendices 1 to 35, wherein the surface of the porous substrate side on which the moisture-permeable membrane is provided has been subjected to a hydrophilization treatment.

[Appendix 37] The laminate according to any one of Appendices 1 to 36, wherein the surface of the porous substrate side on which the moisture-permeable membrane is formed has a surface tension of from 35 to 55 dyn/cm (preferably from 37 to 50 dyn/cm).

[Appendix 38] The laminate according to any one of Appendices 1 to 37, wherein an inner part of the porous substrate, which is a region in which the moisture-permeable membrane is not formed, has a surface tension of less than 35 dyn/cm (preferably 33 dyn/cm or less).

[Appendix 39] The laminate according to any one of Appendices 1 to 38, wherein a moisture permeability is 1600 $g/(m^2 \cdot 24\ h)$ or greater [preferably 1700 $g/(m^2 \cdot 24\ h)$ or greater, and more preferably 1800 $g/(m^2 \cdot 24\ h)$ or greater] based on the moisture permeability testing method according to JIS Z0208-1976 under the conditions of a temperature of 20° C., a relative humidity of 65%, and a wind speed of 0.2 m/s or less.

[Appendix 40] The laminate according to any one of Appendices 1 to 39, wherein a moisture permeability is 300 $g/(m^2 \cdot 24\ h)$ or greater [preferably 400 $g/(m^2 \cdot 24\ h)$ or greater, and more preferably 500 $g/(m^2 \cdot 24\ h)$ or greater] based on the moisture permeability testing method according to JIS Z0208-1976 under the conditions of a temperature of 5° C., a relative humidity of 45%, and a wind speed of 0.2 m/s or less.

[Appendix 41] The laminate according to any one of Appendices 1 to 40, wherein an air resistance based on the Gurley method according to JIS P8117-2009 is 3000 seconds/100 cc or greater (preferably 4000 seconds/100 cc or greater, and more preferably 5000 seconds/100 cc or greater).

[Appendix 42] The laminate according to any one of Appendices 1 to 41, wherein a rate of decrease in air resistance according to the following water resistance test is 50% or less (preferably 20% or less, and more preferably 15% or less):

Water Resistance Test

A test piece of φ7 cm is cut out from the laminate, and the air resistance is measured (initial air resistance). Thereafter, the test piece is immersed in room temperature water for 15 minutes, and then naturally dried at room temperature. The immersion and drying counts as one cycle, and the cycle is repeated 50 times on the test piece, resulting in a test piece after water resistance test. Then, the air resistance of the obtained test piece after water resistance test (air resistance after water resistance test) is measured. Then, the rate of decrease in air resistance is determined in accordance with the following formula. Note that both the initial air resistance above and the air resistance after the water resistance test above are an air resistance based on the Gurley method according to JIS P8117-2009.

Rate of decrease in air resistance (%)=[(initial air resistance)−(air resistance after water resistance test)]/(initial air resistance)×100

[Appendix 43] The laminate according to any one of Appendices 1 to 42, wherein an air resistance after the following water resistance test based on the Gurley method according to JIS P8117-2009 is 3000 seconds/100 cc or greater (preferably 4000 seconds/100 cc or greater, and more preferably 5000 seconds/100 cc or greater):

Water Resistance Test

A test piece of φ7 cm is cut from the laminate, immersed in room temperature water for 15 minutes, and then naturally dried at room temperature. The immersion and drying counts as one cycle, and the cycle is repeated 50 times on the test piece, resulting in a test piece after water resistance test. Then, the air resistance of the obtained test piece after water resistance test is measured.

[Appendix 44] A partition member for total heat exchange element including the laminate according to any one of Appendices 1 to 43.

[Appendix 45] Use of a partition member formed of the laminate according to any one of Appendices 1 to 43 as a partition member for total heat exchange element.

[Appendix 46] A method of producing a partition member for total heat exchange element, the method including changing a shape of the laminate according to any one of Appendices 1 to 43 into a corrugated shape and further performing lamination.

[Appendix 47] A total heat exchange element including:

a plurality of the partition members for total heat exchange element according to Appendix 44, and a spacing member arranged between each of the laminated partition members for total heat exchange element to maintain a space between the adjacent partition members for total heat exchange element, wherein a first air flow path and a second air flow path are alternately formed with the partition member for total heat exchange element interposed therebetween.

[Appendix 48] A ventilation device including the total heat exchange element according to Appendix 47, wherein a supply air supplied from outdoor to indoor flows through the first air flow path of the total heat exchange element while an exhaust air exhausted from indoor to outdoor flows through the second air flow path of the total heat exchange element.

INDUSTRIAL APPLICABILITY

The laminate of the present disclosure has low air permeability and excellent moisture permeability, and also has excellent moisture permeability in a low temperature and low humidity environment; as such, the laminate of the present disclosure can be particularly preferably used as a partition member for total heat exchange element. As such, the present disclosure has industrial applicability.

REFERENCE SIGNS LIST

10 Ventilation device
32 Spacing member
36 First air flow path
37 Second air flow path
40 Laminate
41 Porous substrate
**41*a*** One side of porous substrate
42 Moisture-permeable membrane
121 First air flow path
125 First frame (spacing member)
151 Second air flow path
155 Second frame (spacing member)

The invention claimed is:

1. A laminate comprising a porous substrate and a moisture-permeable membrane disposed on at least one side of the porous substrate, the moisture-permeable membrane comprising a thermoplastic copolymer having a side chain containing a hydrophilic group which is a functional group, wherein the hydrophilic group is a betaine group.

2. The laminate according to claim 1, wherein the copolymer further contains a hydrophobic functional group in a side chain.

3. The laminate according to claim 2, wherein the copolymer is a copolymer comprising: a constituent unit represented by Formula (1) as a constituent unit having the side chain containing the betaine group; and a constituent unit represented by Formula (2) as a constituent unit having the hydrophobic functional group in the side chain, a molar ratio of the constituent unit represented by Formula (1) to the constituent unit represented by Formula (2) being from 1/100 to 100/1:

(1)

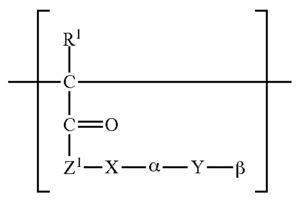

wherein in Formula (1), $R^1$ represents a hydrogen atom or an alkyl group having from 1 to 4 carbons; X represents a divalent hydrocarbon group having from 1 to 4 carbons; Y represents a divalent linear hydrocarbon group having from 1 to 4 carbons; $Z^1$ represents O or NH; α and β represents a combination of a cation and an anion, and (2)

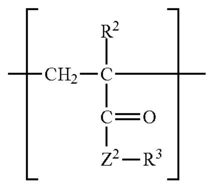

wherein in Formula (2), $R^2$ represents a hydrogen atom or an alkyl group having from 1 to 4 carbons, $R^3$ represents a hydrocarbon group having 2 or more carbons, and $Z^2$ represents O or NH.

4. The laminate according to claim 3, wherein the cation in Formula (1) is an ammonium ion.

5. The laminate according to claim 3, wherein the anion in Formula (1) is a phosphate ion, a sulfate ion, or a carbonate ion.

6. The laminate according to claim 3, wherein Formula (1) above contains a group represented by Formula (1-1), a group represented by Formula (1-2), or a group represented by Formula (1-3):

(1-1)

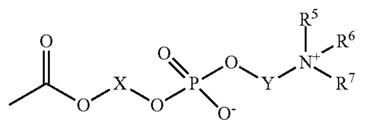

-continued (1-2)

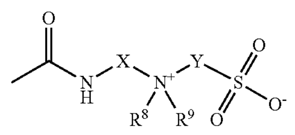

(1-3)

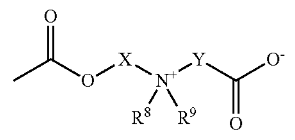

wherein in Formulas (1-1) to (1-3), X and Y are the same as described above, and a bond on the left side of a carbonyl carbon atom bonds to a carbon atom having $R^1$ in Formula (1); in Formula (1-1), $R^5$, $R^6$, and $R^7$ are the same or different and each represent an alkyl group having from 1 to 4 carbons; in Formula (1-2) and Formula (1-3), $R^8$ and $R^9$ are the same or different and each represent an alkyl group having from 1 to 4 carbons.

7. The laminate according to claim 3, wherein the copolymer has a weight average molecular weight of from 20000 to 2000000.

8. The laminate according to claim 3, wherein the copolymer is a random copolymer of a monomer forming the constituent unit represented by Formula (1) and a monomer forming the constituent unit represented by Formula (2).

9. The laminate according to claim 1, wherein a surface of the porous substrate side on which the moisture-permeable membrane is provided has been subjected to a hydrophilization treatment.

10. The laminate according to claim 1, having a moisture permeability of 1600 g/($m^2$·24 h) or greater based on a moisture permeability testing method according to JIS Z0208-1976 under conditions of a temperature of 20° C., a relative humidity of 65%, and a wind speed of 0.2 m/sec or less.

11. The laminate according to claim 1, wherein the moisture-permeable membrane surface has a structure in which a hydrophilic portion and a hydrophobic portion are phase-separated, and a maximum diameter of the hydrophilic portion on the moisture-permeable membrane surface is 50 nm or less.

12. A partition member for total heat exchange element comprising the laminate according to claim 1.

13. A total heat exchange element comprising:

a plurality of the partition members for total heat exchange element according to claim 12; and a spacing member arranged between each of the partition members that are laminated for total heat exchange element to maintain a space between the adjacent partition members for total heat exchange element, wherein a first air flow path and a second air flow path are alternately formed with the partition member for total heat exchange element interposed therebetween.

14. A ventilation device comprising the total heat exchange element according to claim 13, wherein a supply air supplied from outdoor to indoor flows through the first air flow path of the total heat exchange element while an exhaust air exhausted from indoor to outdoor flows through the second air flow path of the total heat exchange element.

* * * * *